(12) United States Patent
Shiono et al.

(10) Patent No.: US 11,709,298 B2
(45) Date of Patent: Jul. 25, 2023

(54) OPTICAL FILTER AND IMAGING DEVICE

(71) Applicant: AGC Inc., Chiyoda-ku (JP)

(72) Inventors: Kazuhiko Shiono, Fukushima (JP);
Nanako Nishimoto, Fukushima (JP);
Sayuri Yamada, Fukushima (JP);
Hiroki Hotaka, Fukushima (JP);
Satoshi Okada, Tokyo (JP); Keigo Matsuura, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 646 days.

(21) Appl. No.: 16/808,480

(22) Filed: Mar. 4, 2020

(65) Prior Publication Data

US 2020/0200956 A1 Jun. 25, 2020

Related U.S. Application Data

(63) Continuation of application No. PCT/JP2018/032845, filed on Sep. 5, 2018.

(30) Foreign Application Priority Data

Sep. 11, 2017 (JP) ................. 2017-174327

(51) Int. Cl.
*G02B 5/28* (2006.01)
*C09B 23/08* (2006.01)
(Continued)

(52) U.S. Cl.
CPC ............ *G02B 5/282* (2013.01); *C09B 23/083* (2013.01); *C09K 3/00* (2013.01); *G02B 5/208* (2013.01)

(58) Field of Classification Search
CPC ........ G02B 5/282; G02B 5/208; G02B 5/281; G02B 5/22; G02B 5/223; C09B 23/083
See application file for complete search history.

(56) References Cited

U.S. PATENT DOCUMENTS 5,271,872 A * 12/1993 Sallavanti ............. G02B 5/223
359/356
2014/0055652 A1 * 2/2014 Hasegawa ............ C09B 57/007
359/359

(Continued)

FOREIGN PATENT DOCUMENTS

WO WO 2016/158461 A1 10/2016
WO WO 2016/181987 A1 11/2016
(Continued)

OTHER PUBLICATIONS

WO2017/051867, Ooi et al., Originally Published Mar. 30, 2017, English Language Machine Translation Generated Aug. 29, 2022 (Year: 2017).*

(Continued)

*Primary Examiner* — Stephone B Allen
*Assistant Examiner* — Adam W Booher
(74) *Attorney, Agent, or Firm* — Oblon, McClelland, Maier & Neustadt, L.L.P.

(57) ABSTRACT

An optical filter includes: an absorption layer including a first near-infrared absorbing dye (D1), a second near-infrared absorbing dye (D2), and a transparent resin; and a reflection layer including a dielectric multilayer film. The dye (D1) and the dye (D2) are squarylium compounds satisfying following (1) to (3). (1) The dye (D1) has a maximum absorption wavelength $\lambda_{max(D1)}$ within a range of 680 to 730 nm, and the difference between a wavelength at which a transmittance is 80% on the shorter wavelength side than $\lambda_{max(D1)}$ when the concentration is adjusted such that a transmittance at $\lambda_{max(D1)}$ is 10%, and $\lambda_{max(D1)}$ is 100 nm or less. (2) The dye (D2) has a maximum absorption wavelength $\lambda_{max(D2)}$ within a range of 720 to 770 nm. (3) A value obtained by subtracting $\lambda_{max(D1)}$ from $\lambda_{max(D2)}$ is 30 nm or more and 85 nm or less.

13 Claims, 1 Drawing Sheet

(51) Int. Cl.
    *G02B 5/20*     (2006.01)
    *C09K 3/00*     (2006.01)

(56) References Cited

U.S. PATENT DOCUMENTS

2018/0067243 A1     3/2018    Shiono et al.
2018/0095203 A1     4/2018    Ooi et al.

FOREIGN PATENT DOCUMENTS

WO     WO 2017/051867 A1     3/2017
WO     WO-2017135359 A1 *     8/2017     .......... C07D 209/08

OTHER PUBLICATIONS

International Search Report dated Dec. 11, 2018 in PCT/JP2018/032845 filed on Sep. 5, 2018 (with English Translation), citing documents AA-AB & AP-AQ therein, 5 pages.

\* cited by examiner

OPTICAL FILTER AND IMAGING DEVICE

TECHNICAL FIELD

The present invention relates to an optical filter that transmits visible light and cuts off near-infrared light, and an imaging device including the optical filter.

BACKGROUND ART

In an imaging device using a solid-state image sensing device, an optical filter capable of transmitting light in the visible region (hereinafter, sometimes referred to as "visible light") and blocking light in the near-infrared region (hereinafter, sometimes referred to as "near-infrared light") is used so as to successfully reproduce a color tone and obtain a clear image. As the optical filter, a near-infrared cut filter including an absorption layer containing a near-infrared absorbing dye, and a reflection layer including a dielectric multilayer film for cutting off near-infrared light is known. More specifically, the dielectric multilayer film itself shows a spectral transmittance curve that changes depending on the incident angle, and therefore, a near-infrared cut filter including both a reflection layer and an absorption layer gives a spectral transmittance curve in which the incident angle dependence is reduced due to absorption characteristics of the absorption layer.

However, with the recent progress toward miniaturization and high quality of an imaging device, it is required to reduce the incident angle dependence for light incident at a higher incident angle. In order to meet such a requirement, for example, Patent Literature 1 describes an optical filter in which an absorption layer containing a compound having an absorption maximum within a wavelength range of 600 nm or more and less than 750 nm and a compound having an absorption maximum within a wavelength range of 750 nm or more and 1,050 nm or less is combined with a reflection layer including a dielectric multilayer film and a multiple reflection upon incidence of near-infrared light from the oblique direction can thereby be reduced.

CITATION LIST

Patent Literature

Patent Literature 1: International Publication No. 2016/158461

SUMMARY OF INVENTION

Technical Problem

However, if a plurality of near-infrared absorbing dyes are added so as to sufficiently reduce the incident angle dependence, this leads to an increase in the dye addition amount, secondarily causing a decrease in the visible light transmittance, particularly the transmittance of blue light, and there has been a problem that the color reproducibility is poor and reduction in the light resistance is involved.

An object of the present invention is to provide an optical filter having excellent near-infrared blocking property, enabling to reduce the incident angle dependence of transmittance over a wide wavelength range for light incident at a high incident angle and in turn, increase the degree of freedom in the reflection layer design, ensuring high transmittance of visible light including blue light, and also exhibiting excellent light resistance, and to provide an imaging device with excellent color reproducibility using the optical filter.

Solution to Problem

The present invention provides an optical filter including an absorption layer containing a first near-infrared absorbing dye (D1), a second near-infrared absorbing dye (D2) and a transparent resin, and a reflection layer including a dielectric multilayer film. The first near-infrared absorbing dye (D1) and the second near-infrared absorbing dye (D2) have the following properties (1) to (3).

(1) The first near-infrared-absorbing dye (D1) is a compound represented by any one of the following formulae (I) to (III), in which in a spectral transmittance curve over a wavelength range of 400 nm to 1,100 nm as measured in a state of the dye being contained in the transparent resin, a maximum absorption wavelength $\lambda_{max(D1)}$ is within a wavelength range of 680 nm to 730 nm, and a difference between a wavelength at which a transmittance is 80% on the shorter wavelength side than the maximum absorption wavelength $\lambda_{max(D1)}$ when the concentration is adjusted such that a transmittance at the maximum absorption wavelength $\lambda_{max(D1)}$ is 10%, and the maximum absorption wavelength $\lambda_{max(D1)}$ is 100 nm or less.

(2) The second near-infrared-absorbing dye (D2) is a compound represented by any one of the following formulae (I) to (III), in which in a spectral transmittance curve over a wavelength range of 400 nm to 1,100 nm as measured in a state of the dye being contained in the transparent resin, a maximum absorption wavelength $\lambda_{max(D2)}$ is within a wavelength range of 720 nm to 770 nm.

(3) A value obtained by subtracting the maximum absorption wavelength $\lambda_{max(D1)}$ from the maximum absorption wavelength $\lambda_{max(D2)}$ is 30 nm or more and 85 nm or less.

[Chem. 1]

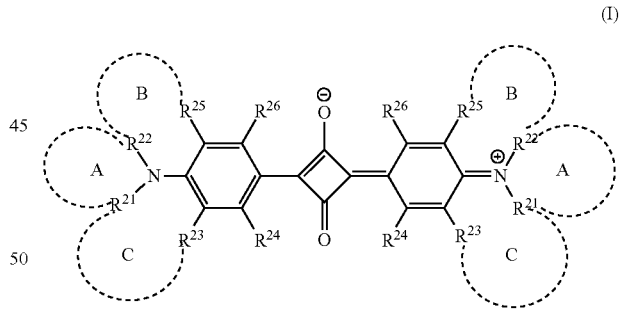

(I)

Symbols in the formula (I) are as follows.

Each of $R^{24}$ and $R^{26}$ independently represents a hydrogen atom, a halogen atom, a hydroxyl group, an alkyl or alkoxy group including 1 to 6 carbon atoms, an acyloxy group including 1 to 10 carbon atoms, —$NR^{27}R^{28}$ (in which each of $R^{27}$ and $R^{28}$ independently represents a hydrogen atom, an alkyl group including 1 to 20 carbon atoms, —C(=O)—$R^{29}$ (in which $R^{29}$ is a hydrogen atom or a hydrocarbon group including 1 to 25 carbon atoms which may include a substituent and may contain, between carbon atoms, an unsaturated bond, an oxygen atom or a saturated or unsaturated ring structure), —$NHR^{30}$, or —$SO_2$—$R^{30}$ (in which each $R^{30}$ represents a hydrocarbon group including 1 to 25 carbon atoms in which one or more hydrogen atoms may be replaced by a halogen atom, a hydroxyl group, a carboxy group, a sulfo group or a cyano group and which may contain, between carbon atoms, an unsaturated bond, an oxygen atom or a saturated or unsaturated ring structure)), or a group represented by the following formula (S) (in which $R^{41}$ and $R^{42}$ independently represent a hydrogen atom, a halogen atom, or an alkyl or alkoxy group including 1 to 10 carbon atoms, and k is 2 or 3).

[Chem. 2]

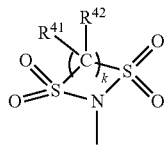

(S)

$R^{21}$ and $R^{22}$, $R^{22}$ and $R^{25}$, and $R^{21}$ and $R^{23}$ may combine with each other to form, respectively, a heterocyclic ring A, a heterocyclic ring B, and a heterocyclic ring C, which are 5- or 6-membered rings together with the nitrogen atom.

$R^{21}$ and $R^{22}$, when forming heterocyclic ring A, represent, as a divalent group -Q- where these are bonded, an alkylene or alkyleneoxy group, in which a hydrogen atom may be replaced by an alkyl group including 1 to 6 carbon atoms, an aryl group including 6 to 10 carbon atoms, or an acyloxy group including 1 to 10 carbon atoms which may include a substituent.

$R^{22}$ and $R^{25}$, when forming heterocyclic ring B, and $R^{21}$ and $R^{23}$, when forming heterocyclic ring C, respectively represent divalent groups —$X^1$—$Y^1$— and —$X^2$—$Y^2$— (in which a side bonded to nitrogen is $X^1$ and $X^2$) where they are bonded, in which each of $X^1$ and $X^2$ is a group represented by the following formula (1x) or (2x) and each of $Y^1$ and $Y^2$ is a group represented by any one selected from the following formulae (1y) to (5y) In a case where each of $X^1$ and $X^2$ is a group represented by the formula (2x), each of $Y^1$ and $Y^2$ may be a single bond, and in this case, an oxygen atom may be present between carbon atoms.

[Chem. 3]

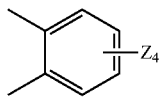

(1x)

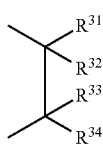

(2x)

(1y)

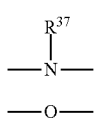

(2y)

—N— (3y)

—O—

—S— (4y)

—Se— (5y)

In the formula (1x), each of four Zs independently represents a hydrogen atom, a hydroxyl group, an alkyl or alkoxy group including 1 to 6 carbon atoms, or —$NR^{38}R^{39}$ (in which each of $R^{38}$ and $R^{39}$ independently represents a hydrogen atom or an alkyl group including 1 to 20 carbon atoms). Each of $R^{31}$ to $R^{36}$ independently represents a hydrogen atom, an alkyl group including 1 to 6 carbon atoms or an aryl group including 6 to 10 carbon atoms, and $R^{37}$ represents an alkyl group including 1 to 6 carbon atoms or an aryl group including 6 to 10 carbon atoms.

$R^{27}$, $R^{28}$, $R^{29}$, $R^{31}$ to $R^{37}$, $R^{21}$ to $R^{23}$ when not forming a heterocyclic ring, and $R^{25}$ may combine with any other member among these to form a 5- or 6-membered ring. $R^{31}$ and $R^{36}$, and $R^{31}$ and $R^{37}$ may be bonded directly.

Each of $R^{21}$ and $R^{22}$ when not forming a heterocyclic ring independently represents a hydrogen atom, an alkyl group or allyl group including 1 to 6 carbon atoms which may include a substituent, or an aryl or alaryl group including 6 to 11 carbon atoms which may include a substituent. Each of $R^{23}$ and $R^{25}$ when not forming a heterocyclic ring independently represents a hydrogen atom, a halogen atom, or an alkyl or alkoxy group including 1 to 6 carbon atoms.

[Chem. 4]

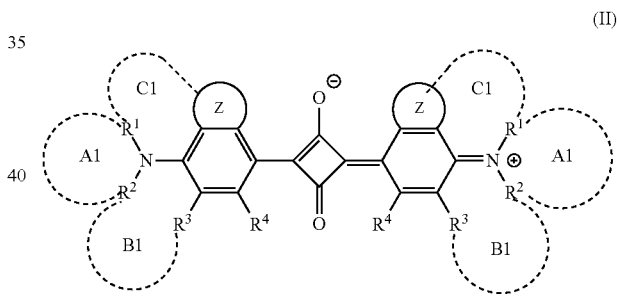

(II)

Symbols in the formula (II) are as follows.

each of rings Z is independently a 5- or 6-membered ring including from 0 to 3 heteroatoms in the ring, and a hydrogen atom contained in ring Z may be replaced.

$R^1$ and $R^2$, $R^2$ and $R^3$, and $R^1$ and a carbon atom or heteroatom constituting ring Z may combine with each other to form, respectively, a heterocyclic ring A1, a heterocyclic ring B1, and a heterocyclic ring C1, together with a nitrogen atom, and in this case, a hydrogen atom contained in the heterocyclic ring A1, heterocyclic ring B1 and heterocyclic ring C1 may be replaced. Each of $R^1$ and $R^2$ when not forming a heterocyclic ring independently represents a hydrogen atom, a halogen atom, or a hydrocarbon group which may contain, between carbon atoms, an unsaturated bond, a heteroatom, or a saturated or unsaturated ring structure and may include a substituent. Each of $R^4$ and $R^3$ when not forming a heterocyclic ring independently represents a hydrogen atom, a halogen atom, or an alkyl or alkoxy group which may contain a heteroatom between carbon atoms and may include a substituent.

[Chem. 5]

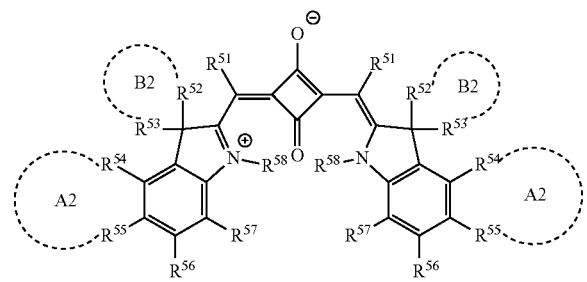

(III)

Symbols in the formula (III) are as follows.

Each $R^{51}$ independently represents a halogen atom or an alkyl group including 1 to 3 carbon atoms which may include a substituent.

Each of $R^{52}$ to $R^{58}$ independently represents a hydrogen atom, a halogen atom, or an alkyl group including 1 to 10 carbon atoms which may include a substituent.

$R^{52}$ and $R^{53}$ may combine with each other to form a saturated or unsaturated hydrocarbon ring B2 including 5 to 15 carbon atoms, and a hydrogen atom of the hydrocarbon ring B2 may be replaced by a halogen atom or an alkyl group including 1 to 10 carbon atoms which may include a substituent.

$R^{54}$ and $R^{55}$ may combine with each other to form a benzene ring A2, and a hydrogen atom of benzene ring A2 may be replaced by a halogen atom or an alkyl group including 1 to 10 carbon atoms which may include a substituent.

In addition, the present invention provides an imaging device including a solid-state image sensing device, an imaging lens, and the optical filter above.

Advantageous Effects of Invention

In the present invention, an optical filter having excellent near-infrared blocking property, enabling to decrease the incident angle dependence over a wide wavelength range for light incident at a high incident angle and in turn, increase the degree of freedom in the reflection layer design, ensuring high transmittance of visible light including blue light, and exhibiting excellent light resistance can be provided. Furthermore, in the present invention, an imaging device with excellent color reproducibility using the optical filter can be provided.

DESCRIPTION OF EMBODIMENTS

Figure 1:
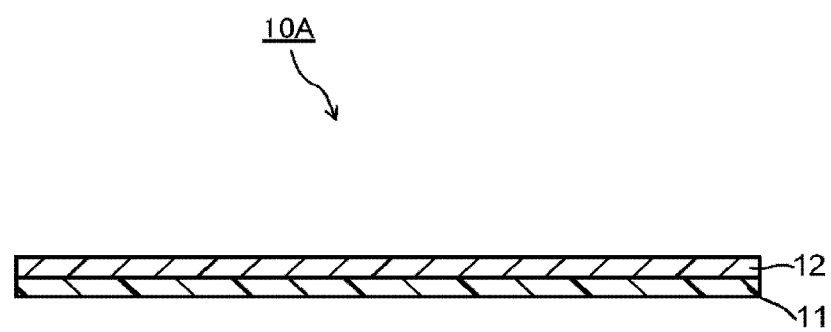
FIG. 1 is a cross-sectional diagram schematically illustrating an example of the optical filter of the embodiment.

The embodiments of the present invention are described below.

In the present description, a near-infrared absorbing dye and an ultraviolet absorbing dye are sometimes simply referred to as "NIR dye" and "UV dye", respectively.

In the present description, an NIR dye including a compound represented by the formula (I) is sometimes referred to as NIR dye (I), and the same holds true for other dyes. For example, an NIR dye including a compound represented by the later-described formula (I-1) is referred to as an NIR dye (I-1). In addition, for example, a group represented by the formula (1n) is sometimes referred to as a group (1n), and the same holds true for groups represented by other formulae.

In the present description, with respect to a specific wavelength region, in a case where the transmittance is, for example, 90% or more, this means that the transmittance is not less than 90% over the entire wavelength range. Similarly, when the transmittance is, for example, 1% or less, this means that the transmittance does not exceed 1% in the entire wavelength range. An average transmittance in the specific wavelength region is an arithmetic average of transmittances measured every 1 nm in the wavelength region above.

In the present description, a numerical value range expressed using "to" includes upper and lower limits.

Optical Filter

The optical filter in one embodiment of the present invention (hereinafter, sometimes referred to as "the present filter") includes an absorption layer containing a first NIR dye (D1) (hereinafter, sometimes referred to as "dye (D1)"), a second NIR dye (D2) (hereinafter, sometimes referred to as "dye (D2)"), and a transparent resin, and a reflection layer including a dielectric multilayer film. The dye (D1) and the dye (D2) have following properties of (1) to (3). In the following description, a "reflection layer" indicates the reflection layer including a dielectric multilayer film.

(1) The dye (D1) is a compound represented by any one of the formulae (I) to (III), in a spectral transmittance curve over a wavelength range of 400 nm to 1,100 nm as measured in a state of the dye being contained in the transparent resin, the maximum absorption wavelength $\lambda_{max(D1)}$ is within a wavelength range of 680 nm to 730 nm, and the difference between a wavelength (hereinafter, denoted by "$\lambda_{SH80(D1)}$") at which the transmittance is 80% on the shorter wavelength side than the maximum absorption wavelength $\lambda_{max(D1)}$ when the concentration is adjusted such that a transmittance at the maximum absorption wavelength $\lambda_{max(D1)}$ is 10%, and the maximum absorption wavelength $\lambda_{max(D1)}$ is 100 nm or less.

(2) The dye (D2) is a compound represented by any one of the formulae (I) to (III), in which in a spectral transmittance curve over a wavelength range of 400 nm to 1,100 nm as measured in a state of the dye being contained in the transparent resin, a maximum absorption wavelength $\lambda_{max(D2)}$ is within a wavelength range of 720 nm to 770 nm.

(3) A value obtained by subtracting the maximum absorption wavelength $\lambda_{max(D1)}$ from the maximum absorption wavelength $\lambda_{max(D2)}$ is 30 nm or more and 85 nm or less.

The present filter enables absorption of light on the shorter wavelength side in the near infrared region by virtue of containing the dye (D1) having properties of (1) in the absorption layer, and has such properties that the transmittance curve in the vicinity of the boundary between near infrared light and visible light becomes steep.

Furthermore, in the present filter, the absorption layer contains the dye (D2) which has properties of (2) and satisfies (3) in the relationship with the dye (D1), and absorption by the dye (D1) and absorption by the dye (D2) are thereby overlapped, making it possible to exhibit a wide absorption band. In turn, the incident angle dependence for light incident at a high incident angle, which occurs due to including a reflection layer, can be reduced.

Both the dye (D1) and the dye (D2) are, as described in (1) and (2), a squarylium compound having a specific structure represented by any one of the formula (I) to (III), and due to use of these dyes, the absorption layer has high transmittance of visible light including blue light and excellent light resistance.

The present filter may further include a transparent substrate. In this case, the absorption layer and the reflection layer are provided on a principal surface of the transparent substrate. The present filter may be provided with the absorption layer and the reflection layer on the same principal surface or different principal surfaces of the transparent substrate. In the case of including the absorption layer and the reflection layer on the same principal surface, the order of stacking the layers is not particularly limited.

The present filter may also include other functional layers. Other functional layers include, for example, an antireflection layer for reducing transmittance loss of visible light. In particular, in the case of taking a configuration where the absorption layer is the outermost surface, the antireflection film may be provided on the absorption layer, because a visible light transmittance loss occurs due to reflection at an interface between the absorption layer and the air.

Next, configuration examples of the present filter are described using the drawings. FIG. 1 illustrates a configuration example of an optical filter 10A including a reflection layer 12 on one principal surface of an absorption layer 11. In the optical filter 10A, the absorption layer 11 can be composed of a layer containing the dye (D1), the dye (D2) and a transparent resin. Here, "including a reflection layer 12 on one principal surface of an absorption layer 11" encompasses not only a case where the reflection layer 12 is provided in contact with the absorption layer 11 but also a case where another functional layer is provided between the absorption layer 11 and the reflection layer 12, and the same holds true for the configurations described below.

Figure 2:
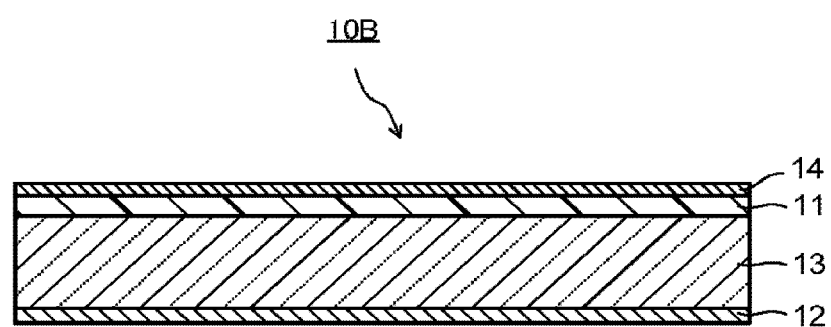
FIG. 2 is a cross-sectional diagram schematically illustrating another example of the optical filter of the embodiment.

FIG. 2 is a cross-sectional diagram schematically illustrating an example of the optical filter of the embodiment including a transparent substrate, an absorption layer and a reflection layer. The optical filter 10B includes a transparent substrate 13, an absorption layer 11 disposed on one principal surface of the transparent substrate 13, and a reflection layer 12 provided on the other principal surface of the transparent substrate 13. In the optical filter 10B, the absorption layer 11 can be composed of a layer containing the dye (D1), the dye (D2) and a transparent resin. The optical filter 10B further includes an antireflection layer 14 on a principal surface of the absorption layer 11, which is on the side opposite the transparent substrate 13.

The absorption layer, reflection layer, transparent substrate and antireflection layer are described below.

Absorption Layer

The absorption layer contains the dyes (D1) and (D2) having properties of (1) to (3) above, and a transparent resin.

Dye (D1)

The dye (D1) is a compound represented by any one of the following formulae (1) to (III), in which $\lambda_{max(D1)}$ is within a wavelength range of 680 nm to 730 nm and the difference between $\lambda_{SH80(D1)}$ and $\lambda_{max(D1)}$ is 100 nm or less. The difference between $\lambda_{SH80(D1)}$ and $\lambda_{max(D1)}$ is preferably 85 nm or less, more preferably 80 nm or less. In addition, the mass absorption constant when the dye (D1) is contained in the transparent resin is preferably 1,000/(cm·mass %) or more, more preferably 1,500/(cm·mass %) or more.

[Chem. 6]

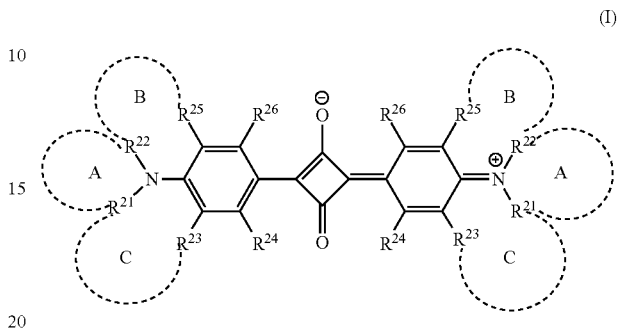

(I)

Symbols in the formula (I) are as follows.

Each of $R^{24}$ and $R^{26}$ independently represents a hydrogen atom, a halogen atom, a hydroxyl group, an alkyl or alkoxy group including 1 to 6 carbon atoms, an acyloxy group including 1 to 10 carbon atoms, $-NR^{27}R^{28}$ (in which each of $R^{27}$ and $R^{28}$ independently represents a hydrogen atom, an alkyl group including 1 to 20 carbon atoms, $-C(=O)-R^{29}$ (in which $R^{29}$ is a hydrogen atom or a hydrocarbon group including 1 to 25 carbon atoms which may include a substituent and may contain, between carbon atoms, an unsaturated bond, an oxygen atom or a saturated or unsaturated ring structure), $-NHR^{30}$, or $-SO_2-R^{30}$ (in which each $R^{30}$ represents a hydrocarbon group including 1 to 25 carbon atoms in which one or more hydrogen atoms may be replaced by a halogen atom, a hydroxyl group, a carboxy group, a sulfo group or a cyano group or which may contain, between carbon atoms, an unsaturated bond, an oxygen atom or a saturated or unsaturated ring structure)), or a group represented by the following formula (S) (in which $R^{41}$ and $R^{42}$ independently represent a hydrogen atom, a halogen atom, or an alkyl or alkoxy group including 1 to 10 carbon atoms, and k is 2 or 3).

[Chem. 7]

(S)

$R^{21}$ and $R^{22}$, $R^{22}$ and $R^{25}$, and $R^{21}$ and $R^{23}$ may combine with each other to form, respectively, heterocyclic ring A, heterocyclic ring B, and heterocyclic ring C, which are 5- or 6-membered rings, together with a nitrogen atom.

$R^{21}$ and $R^{22}$ when forming a heterocyclic ring A represent, as a divalent group -Q- where they are bonded, an alkylene or alkyleneoxy group in which a hydrogen atom may be replaced by an alkyl group including 1 to 6 carbon atoms, an aryl group including 6 to 10 carbon atoms, or an acyloxy group including 1 to 10 carbon atoms which may include a substituent.

$R^{22}$ and $R^{25}$ when forming heterocyclic ring B, and $R^{21}$ and $R^{23}$ when forming heterocyclic ring C, respectively represent divalent groups —X¹—Y¹— and —X²—Y²— (a side bonded to nitrogen is X¹ and X²) where they are bonded, in which each of X¹ and X² is a group represented by the following formula (1x) or (2x) and each of Y¹ and Y² is a group represented by any selected from the following formulae (1y) to (5y). In a case where each of X¹ and X² is a group represented by the formula (2x), each of Y¹ and Y² may be a single bond, and in this case, an oxygen atom may be present between carbon atoms.

[Chem. 8]

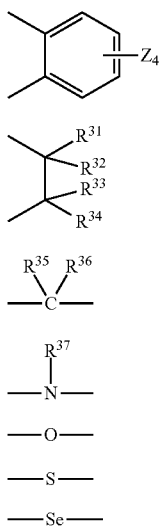

(1x)

(2x)

(1y)

(2y)

(3y)

(4y)

(5y)

In the formula (1x), each of four Zs independently represents a hydrogen atom, a hydroxyl group, an alkyl or alkoxy group including 1 to 6 carbon atoms, or —NR³⁸R³⁹ (in which each of R³⁸ and R³⁹ independently represents a hydrogen atom or an alkyl group including 1 to 20 carbon atoms). Each of R³¹ to R³⁶ independently represents a hydrogen atom, an alkyl group including 1 to 6 carbon atoms or an aryl group including 6 to 10 carbon atoms, and R³⁷ represents an alkyl group including 1 to 6 carbon atoms or an aryl group including 6 to 10 carbon atoms.

R²⁷, R²⁸, R²⁹, R³¹ to R³⁷, R²¹ to R²³ and R²⁵ when not forming a heterocyclic ring may combine with any other member among these to form a 5- or 6-membered ring. R³¹ and R³⁶, and R³¹ and R³⁷ may be bonded directly.

Each of R²¹ and R²² when not forming a heterocyclic ring independently represents a hydrogen atom, an alkyl group or allyl group including 1 to 6 carbon atoms which may include a substituent, or an aryl or alaryl group including 6 to 11 carbon atoms which may include a substituent. Each of R²³ and R²⁵ when not forming a heterocyclic ring independently represents a hydrogen atom, a halogen atom, or an alkyl or alkoxy group including 1 to 6 carbon atoms.

In the formula (I), unless specified otherwise, the hydrocarbon group is an alkyl group, an aryl group, or an alaryl group. Unless specified otherwise, the alkyl group and the alkyl moiety in an alkoxy group, an aryl group or an alaryl group may be linear, branched or cyclic or may be a structure formed by combining these structures. The same holds true for the hydrocarbon group, alkyl group, alkoxy group, aryl group and alaryl group in other formulae described below. In the formula (I), examples of the substituent in R²⁹ include a halogen atom, a hydroxyl group, a carboxy group, a sulfo group, a cyano group, and an acyloxy group including 1 to 6 carbon atoms. Examples of the substituent in the case of "which may include a substituent" except for R²⁹ include a halogen atom and an alkoxy group including 1 to 15 carbon atoms. Examples of the halogen atom include a fluorine atom, a chlorine atom, a bromine atom, an iodine atom, etc., and a fluorine atom and a chlorine atom are preferred.

[Chem. 9]

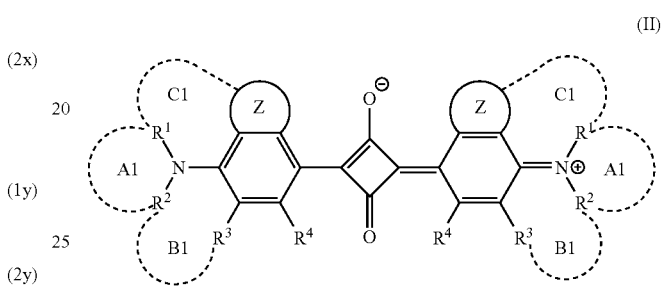

(II)

Symbols in the formula (II) are as follows.

Each of rings Z is independently a 5- or 6-membered ring including from 0 to 3 heteroatoms in the ring, and a hydrogen atom contained in ring Z may be replaced. In a case where a hydrogen atom is replaced, examples of the substituent include a halogen atom and an alkyl group including 1 to 10 carbon atoms which may include a substituent.

R¹ and R², R² and R³, and R¹ and a carbon atom or heteroatom constituting ring Z may combine with each other to form, respectively, heterocyclic ring A1, heterocyclic ring B1, and heterocyclic ring C1, together with a nitrogen atom, and in this case, a hydrogen atom contained in heterocyclic ring A1, heterocyclic ring B1 and heterocyclic ring C1 may be replaced. In a case where a hydrogen atom is replaced, examples of the substituent include a halogen atom and an alkyl group including 1 to 15 carbon atoms which may include a substituent.

Each of R¹ and R² when not forming a heterocyclic ring independently represents a hydrogen atom, a halogen atom, or a hydrocarbon group which may contain, between carbon atoms, an unsaturated bond, a heteroatom, or a saturated or unsaturated ring structure and may include a substituent. Each of R⁴ and R³ when not forming a heterocyclic ring independently represents a hydrogen atom, a halogen atom, or an alkyl or alkoxy group which may contain a heteroatom between carbon atoms and may include a substituent.

In the formula (II), the carbon number of the hydrocarbon group may be from 1 to 15, and the carbon number of the alkyl or alkoxy group may be from 1 to 10. In the formula (II), examples of the substituent in the case of "which may include a substituent" include a halogen atom and an alkoxy group including 1 to 10 carbon atoms. Examples of the halogen atom include a fluorine atom, a chlorine atom, a bromine atom, an iodine atom, etc., and a fluorine atom and a chlorine atom are preferred.

[Chem. 10]

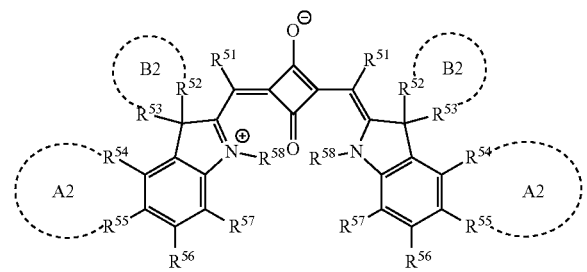

(III)

Symbols in the formula (III) are as follows.

Each $R^{51}$ independently represents a halogen atom or an alkyl group including 1 to 3 carbon atoms which may include a substituent.

Each of $R^{52}$ to $R^{58}$ independently represents a hydrogen atom, a halogen atom, or an alkyl group including 1 to 10 carbon atoms which may include a substituent.

$R^{52}$ and $R^{53}$ may combine with each other to form a saturated or unsaturated hydrocarbon ring B2 including 5 to 15 carbon atoms, and a hydrogen atom of hydrocarbon ring B2 may be replaced by a halogen atom or an alkyl group including 1 to 10 carbon atoms which may include a substituent.

$R^{54}$ and $R^{55}$ may combine with each other to form benzene ring A2, and a hydrogen atom of benzene ring A2 may be replaced by a halogen atom or an alkyl group including 1 to 10 carbon atoms which may include a substituent.

In the formula (III), examples of the substituent in the case of "which may include a substituent" include a halogen atom and an alkoxy group including 1 to 10 carbon atoms. Examples of the halogen atom include a fluorine atom, a chlorine atom, a bromine atom, an iodine atom, etc., and a fluorine atom and a chlorine atom are preferred.

The dye (D1) is preferably selected from any of the compound (1) and the compounds represented by the following formulae (II-1) and (II-2), because the absorption capacity in the absorption region including $\lambda_{max(D1)}$ is high and the transmittance of visible light is excellent.

[Chem. 11]

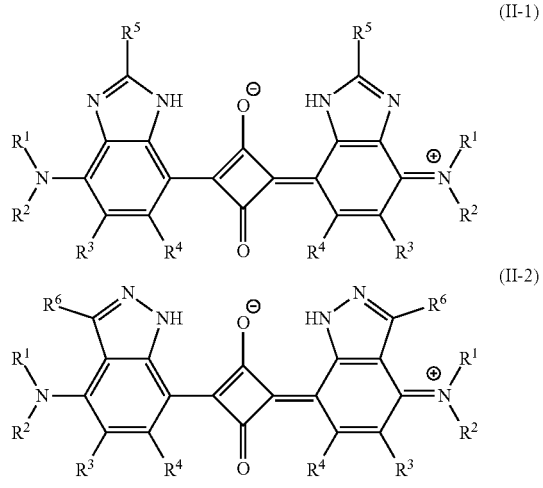

In the formulae (II-1) and (II-2), each of $R^1$ and $R^2$ independently represents a hydrogen atom, a halogen atom, or an alkyl group including 1 to 15 carbon atoms which may include a substituent, and each of $R^3$ to $R^6$ independently represents a hydrogen atom, a halogen atom, or an alkyl group including 1 to 10 carbon atoms which may include a substituent.

Here, the compound (I) may have a structure of the formula (I'). Note that the compound (I') and the compound (I) are structures resonating with each other and in the present description, the compound (I') is dealt with as the compound (I).

[Chem. 12]

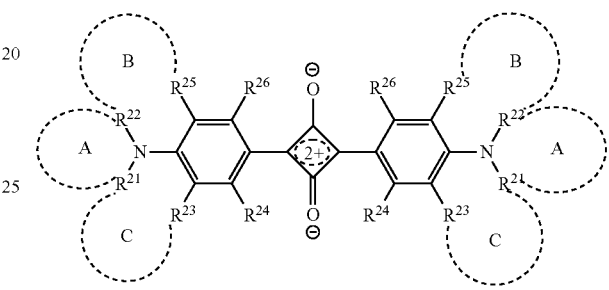

(I')

Symbols in the formula (I') are the same as the respective definitions of the same symbols in the formula (I).

Examples of the compound (I) include a compound represented by any one of the formulae (I-1) to (I-4), and the dye (D1) is preferably a compound represented by any one of the formulae (I-1) to (I-3), more preferably a compound (I-1) represented by the formula (I-1).

[Chem. 13]

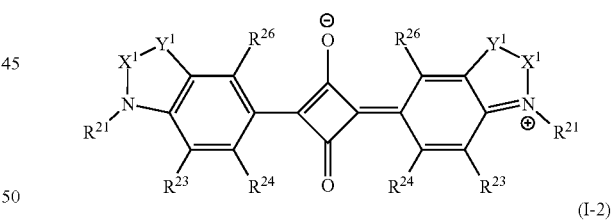

(I-1)

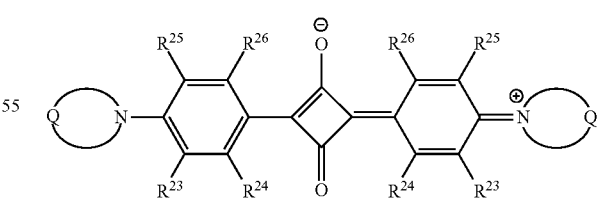

(I-2)

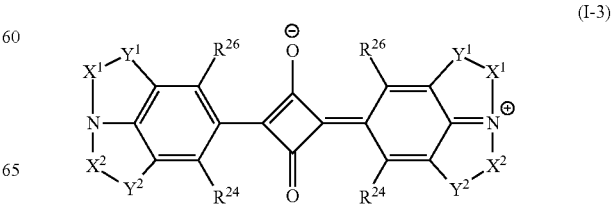

(I-3)

-continued (I-4)

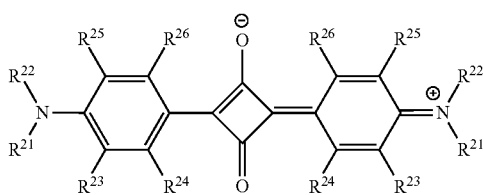

Here, symbols in the formulae (I-1) to (I-4) are the same as the respective definitions of the same symbols in the formula (I), and preferable embodiments are also the same.

In the compound (I-1), $X^1$ is preferably a group (2x), and $Y^1$ is preferably a single bond or a group (1y). In this case, $R^{31}$ to $R^{36}$ are preferably a hydrogen atom or an alkyl group including 1 to 3 carbon atoms, more preferably a hydrogen atom or a methyl group. Specific examples of —$Y^1$—$X^1$— include divalent organic groups represented by the formulae (11-1) to (12-3).

—C(CH₃)₂—CH(CH₃)—      (11-1)

—C(CH₃)₂—CH₂—      (11-2)

—C(CH₃)₂—CH(C₂H₅)—      (11-3)

—C(CH₃)₂—C(CH₃)(nC₃H₇)—      (11-4)

—C(CH₃)₂—CH₂—CH₂—      (12-1)

—C(CH₃)₂—CH₂—CH(CH₃)—      (12-2)

—C(CH₃)₂—CH(CH₃)—CH₂—      (12-3)

Furthermore, in the compound (I-1), in view of solubility, heat resistance and steepness of change in the vicinity of boundary between the visible region and the near-infrared region in a spectral transmittance curve, $R^{21}$ is independently more preferably a group represented by the formula (4-1) or (4-2).

[Chem. 14]

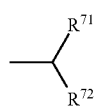

(4-1)

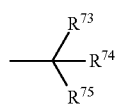

(4-2)

In the formulae (4-1) and (4-2), each of $R^{71}$ to $R^{75}$ independently represents a hydrogen atom, a halogen atom, or an alkyl group including 1 to 4 carbon atoms.

In the compound (I-1), $R^{24}$ is preferably —$NR^{27}R^{28}$. In view of solubility in a transparent resin or a solvent used at the time of forming an absorption layer (hereinafter, sometimes referred to as "host solvent"), —$NR^{27}R^{28}$ is preferably —NH—C(=O)—$R^{29}$. A compound where in the compound (I-1), $R^{24}$ is —NH—C(=O)—$R^{29}$, is represented by the formula (I-11).

[Chem. 15]

(I-11)

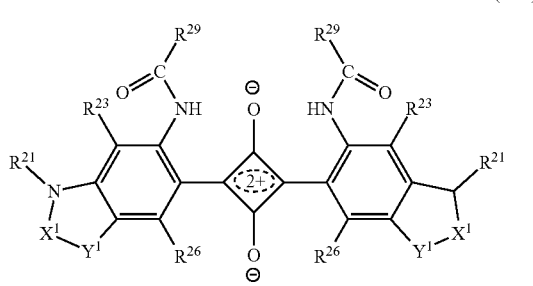

In the compound (I-11), $R^{23}$ and $R^{26}$ are independently, preferably a hydrogen atom, a halogen atom, or an alkyl or alkoxy group including 1 to 6 carbon atoms, and it is more preferred that both are a hydrogen atom.

In the compound (I-11), $R^{29}$ is preferably an alkyl group including 1 to 20 carbon atoms which may include a substituent, an aryl group including 6 to 10 carbon atoms which may include a substituent, or an alaryl group including 7 to 18 carbon atoms which may include a substituent and may include an oxygen atom between carbon atoms. Examples of the substituent include a halogen atom such as fluorine atom, a hydroxyl group, a carboxy group, a sulfo group, a cyano group, an alkyl group including 1 to 6 carbon atoms, a fluoroalkyl group including 1 to 6 carbon atoms, an alkoxy group including 1 to 6 carbon atoms, an acyloxy group including 1 to 6 carbon atoms, etc.

$R^{29}$ is preferably a group selected from a linear, branched or cyclic alkyl group including 1 to 17 carbon atoms which may be substituted by a fluorine atom, a phenyl group which may be substituted by a fluoroalkyl group including 1 to 6 carbon atoms and/or an alkoxy group including 1 to 6 carbon atoms, and an alaryl group including 7 to 18 carbon atoms which may include an oxygen atom between carbon atoms and include, on its terminal, an alkyl group including 1 to 6 carbon atoms which may be substituted by a fluorine atom, and/or a phenyl group which may be substituted by an alkoxy group including 1 to 6 carbon atoms.

$R^{29}$ is also preferably a group that is a hydrocarbon group including 5 to 25 carbon atoms including at least one branch, in which one or more hydrogen atoms may be independently replaced by a halogen atom, a hydroxyl group, a carboxy group, a sulfo group, or a cyano group, and which may contain, between carbon atoms, an unsaturated bond, an oxygen atom, or a saturated or unsaturated ring structure. Examples of such $R^{29}$ include groups represented by the following formulae (1a), (1b), (2a) to (2e), and (3a) to (3e).

[Chem. 16]

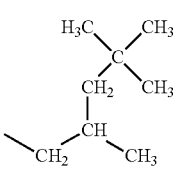

(1a)

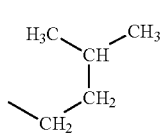

(1b)

-continued (2a) 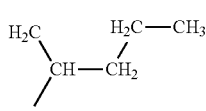

(2b) 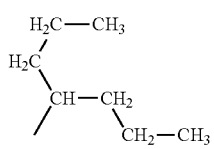

(2c) 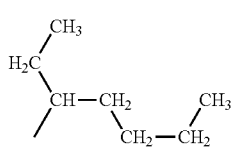

(2d) 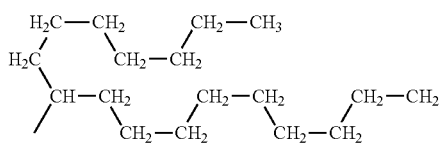

(2e) 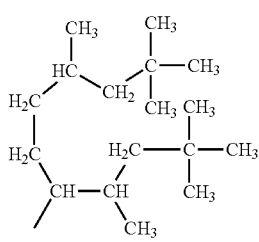

[Chem. 17]

(3a) 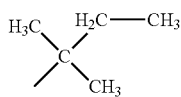

(3b) 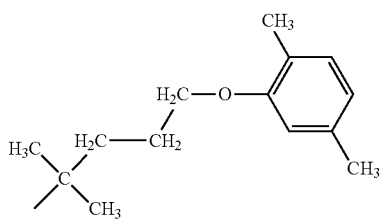

(3c) 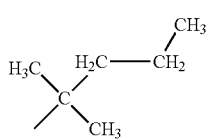

(3d) 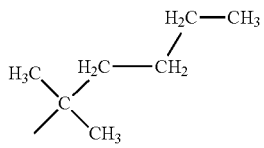

(3e) 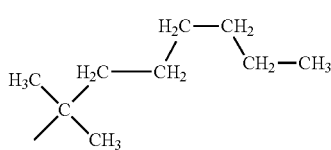

More specifically, examples of the compound (I-11) include compounds shown in Table 1 below. In Table 1, the group (11-1) is shown by (11-1). The same holds true for other groups.

TABLE 1

| Abbr. of Dye | Substituent | | $R^{29}$ | $R^{23}$ | $R^{26}$ |
|---|---|---|---|---|---|
| | —$Y^1$—$X^1$— | $R^{21}$ | | | |
| I-11-1 | (11-1) | —$CH_3$ | (2b) | H | H |
| I-11-2 | (11-1) | —$CH_3$ | (2c) | H | H |
| I-11-3 | (11-1) | —$CH_3$ | (2d) | H | H |
| I-11-4 | (11-1) | —$CH_3$ | (2e) | H | H |
| I-11-5 | (11-1) | —$CH_2CH_3$ | (2c) | H | H |
| I-11-6 | (11-1) | —$CH_2CH_2CH_3$ | (2c) | H | H |
| I-11-7 | (11-1) | —$CH(CH_3)_2$ | (2c) | H | H |
| I-11-8 | (11-1) | —$CH_2CH_3$ | (3b) | H | H |
| I-11-9 | (11-1) | —$CH_3$ | (1b) | H | H |
| I-11-10 | (11-1) | —$CH_3$ | (2a) | H | H |
| I-11-11 | (11-1) | —$CH_3$ | (1a) | H | H |
| I-11-12 | (11-1) | —$CH_3$ | (3a) | H | H |
| I-11-13 | (11-1) | —$CH_3$ | (3b) | H | H |
| I-11-14 | (11-1) | —$CH_3$ | (3c) | H | H |
| I-11-15 | (11-1) | —$C(CH_3)_2CH_2CH_3$ | (2c) | H | H |
| I-11-16 | (11-1) | —$C(CH_3)_2CH_2CH_3$ | (3b) | H | H |
| I-11-17 | (11-1) | —$C(CH_3)_2CH_2CH_3$ | (3c) | H | H |
| I-11-18 | (11-1) | —$C(CH_3)_2CH_2CH_3$ | (3d) | H | H |
| I-11-19 | (11-1) | —$C(CH_3)_2CH_2CH_3$ | (3e) | H | H |

In the compound (I-1), from the viewpoint of increasing the transmittance of visible light, particularly, transmittance of light at a wavelength of 430 nm to 550 nm, $R^{24}$ is preferably —NH—$SO_2$—$R^{30}$. A compound where in the compound (I-1), $R^{24}$ is —NH—$SO_2$—$R^{30}$, is represented by the formula (I-12).

[Chem. 18]

(I-12)

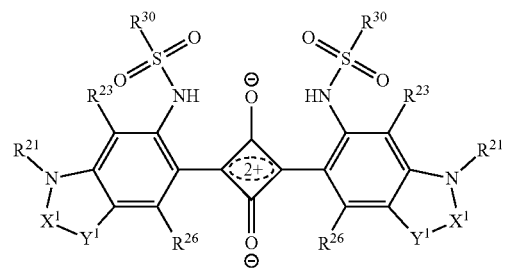

In the compound (I-12), each of $R^{23}$ and $R^{26}$ is independently, preferably a hydrogen atom, a halogen atom, or an alkyl or alkoxy group including 1 to 6 carbon atoms, and it is more preferred that both are a hydrogen atom.

In the compound (I-12), in view of light resistance, $R^{30}$ is independently, preferably an alkyl or alkoxy group including 1 to 12 carbon atoms which may include a branch, or a hydrocarbon group including 6 to 16 carbon atoms including an unsaturated ring structure. Examples of the unsaturated ring structure include benzene, toluene, xylene, furan, benzofuran, etc. $R^{30}$ is independently, more preferably an alkyl or alkoxy group including 1 to 12 carbon atoms which may include a branch. In each group that $R^{30}$ represents, part or all of hydrogen atoms may be replaced by a halogen atom, particularly, by a fluorine atom. In the case where the present filter includes a transparent substrate, substitution of hydrogen atom with fluorine atom is performed to such an extent as to cause no reduction of adhesion between the absorption layer containing the compound (I-12) and the transparent substrate.

Specific examples of $R^{30}$ including an unsaturated ring structure include groups represented by the following formulae (P1) to (P8).

[Chem. 19]

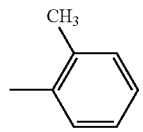

(P1)

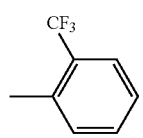

(P2)

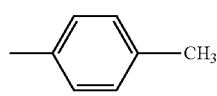

(P3)

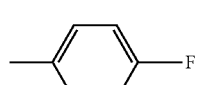

(P4)

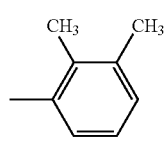

(P5)

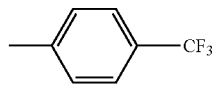

(P6)

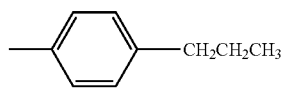

(P7)

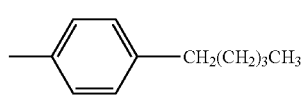

(P8)

Examples of the compound (I-12) include, more specifically, compounds shown in Table 2 below.

TABLE 2

| | Substituent | | | | |
|---|---|---|---|---|---|
| Abbr. of Dye | $-Y^1-X^1-$ | $R^{21}$ | $R^{30}$ | $R^{23}$ | $R^{26}$ |
| I-12-1 | (11-1) | $-CH_3$ | $-CH_2(CH_2)_6CH_3$ | H | H |
| I-12-2 | (11-1) | $-CH_3$ | $-CF_3$ | H | H |
| I-12-3 | (11-1) | $-CH_3$ | $-CF_2(CF_2)_2CF_3$ | H | H |
| I-12-4 | (11-1) | $-CH_3$ | (P2) | H | H |
| I-12-5 | (11-1) | $-CH_3$ | (P5) | H | H |
| I-12-6 | (11-1) | $-CH_3$ | (P7) | H | H |
| I-12-7 | (11-1) | $-CH_3$ | (P8) | H | H |
| I-12-8 | (11-1) | $-CH_3$ | (P6) | H | H |
| I-12-9 | (11-1) | $-CH(CH_3)_2$ | $-CF_3$ | H | H |
| I-12-10 | (11-1) | $-CH(CH_3)_2$ | $-CH(CH_3)_2$ | H | H |
| I-12-11 | (11-1) | $-CH(CH_3)_2$ | (P4) | H | H |
| I-12-12 | (11-1) | $-CH(CH_3)_2$ | (P3) | H | H |
| I-12-13 | (11-1) | $-CH(CH_3)_2$ | $-CH_2CH_2CH_3$ | H | H |
| I-12-14 | (11-1) | $-CH(CH_3)_2$ | (P7) | H | H |
| I-12-15 | (11-1) | $-CH(CH_3)_2$ | $-CH_2(CH_2)_6CH_3$ | H | H |
| I-12-16 | (11-1) | $-CH(CH_3)_2$ | (P6) | H | H |
| I-12-17 | (11-1) | $-CH(CH_3)_2$ | $-CF_2(CF_2)_2CF_3$ | H | H |
| I-12-18 | (11-1) | $-CH(CH_3)_2$ | (P1) | H | H |
| I-12-19 | (11-1) | $-CH(CH_3)_2$ | (P8) | H | H |
| I-12-20 | (11-1) | $-C(CH_3)_2CH_2CH_3$ | $-CH_2(CH_2)_6CH_3$ | H | H |
| I-12-21 | (11-1) | $-C(CH_3)_2CH_2CH_3$ | $-CF_3$ | H | H |
| I-12-22 | (11-1) | $-C(CH_3)_2CH_2CH_3$ | $-CF_2(CF_2)_2CF_3$ | H | H |
| I-12-23 | (11-4) | $-CH(CH_3)_2$ | $-CH_2(CH_2)_6CH_3$ | H | H |

In the compounds (II-1) and (II-2), in view of solubility in the transparent resin, visible light transmission, etc., $R^1$ and $R^2$ are independently, preferably an alkyl group including 1 to 15 carbon atoms, more preferably an alkyl group including 7 to 15 carbon atoms. It is still more preferred that at least one of $R^1$ and $R^2$ is an alkyl group including 7 to 15 carbon atoms including a branched chain, and it is yet still more preferred that both of $R^1$ and $R^2$ are an alkyl group including 8 to 15 carbon atoms including a branched chain.

In view of solubility in the transparent resin, visible light transmission, etc., $R^3$ is independently, preferably a hydrogen atom, a halogen atom, or an alkyl group including 1 to 3 carbon atoms, more preferably a hydrogen atom, a halogen atom, or a methyl group. In view of steepness of change in the vicinity of boundary between the visible region and the near-infrared region, $R^4$ is preferably a hydrogen atom or a halogen atom, more preferably a hydrogen atom. $R^5$ in the compound (II-1) and $R^6$ in the compound (II-2) are independently, preferably a hydrogen atom, a halogen atom, or an alkyl group including 1 to 8 carbon atoms which may be substituted by a halogen atom, more preferably a hydrogen atom, a halogen atom, or a methyl group.

Examples of the compound (II-1) and the compound (II-2) include, more specifically, compounds shown in Table 3 and Table 4 below, respectively. In Tables 3 and 4, —$C_8H_{17}$, —$C_4H_9$, and —$C_6H_{13}$ represent a linear octyl group, a linear butyl group, and a linear hexyl group, respectively.

TABLE 3

| Abbr. of Dye | Substituent | | | | |
|---|---|---|---|---|---|
| | $R^1$ | $R^2$ | $R^3$ | $R^4$ | $R^5$ |
| II-1-1 | —$CH_2CH(C_2H_5)(C_4H_9)$ | —$CH_2CH(C_2H_5)(C_4H_9)$ | H | H | H |
| II-1-2 | —$CH_2CH(C_2H_5)(C_4H_9)$ | —$CH_2CH(C_2H_5)(C_4H_9)$ | H | H | —$C(CH_3)_3$ |
| II-1-3 | —$CH_2CH(C_2H_5)(C_4H_9)$ | —$CH_2CH(C_2H_5)(C_4H_9)$ | H | H | —$CF_3$ |
| II-1-4 | —$CH_2CH(C_2H_5)(C_4H_9)$ | —$CH_2CH(C_2H_5)(C_4H_9)$ | H | H | —$CH_3$ |
| II-1-5 | —$CH_2CH(C_2H_5)(C_4H_9)$ | —$CH_2CH(C_2H_5)(C_4H_9)$ | H | H | —$C_8H_{17}$ |
| II-1-6 | —$(CH_2)_2CH(CH_3)_2$ | —$(CH_2)_2CH(CH_3)_2$ | H | H | H |
| II-1-7 | —$CH_2CH(CH_3)_2$ | —$CH_2CH(CH_3)_2$ | H | H | H |
| II-1-8 | —$CH_2CH(C_2H_5)(C_4H_9)$ | —$C_2H_5$ | H | H | H |
| II-1-9 | —$(CH_2)_5CH_3$ | —$(CH_2)_3CH_3$ | H | H | H |
| II-1-10 | —$CH_2CH(C_2H_5)(C_6H_{13})$ | —$CH_2CH(C_2H_5)(C_6H_{13})$ | H | H | H |

TABLE 4

| Abbr. of Dye | Substituent | | | | |
|---|---|---|---|---|---|
| | $R^1$ | $R^2$ | $R^3$ | $R^4$ | $R^6$ |
| II-2-1 | —$(CH_2)_2CH(CH_3)_2$ | —$(CH_2)_2CH(CH_3)_2$ | H | H | H |
| II-2-2 | —$CH_2CH(C_2H_5)(C_4H_9)$ | —$CH_2CH(C_2H_5)(C_4H_9)$ | H | H | H |
| II-2-3 | —$CH_2CH(CH_3)_2$ | —$CH_2CH(CH_3)_2$ | H | H | H |
| II-2-4 | —$CH_2CH(C_2H_5)(C_6H_{13})$ | —$CH_2CH(C_2H_5)(C_6H_{13})$ | H | H | H |

Dye (D2)

The dye (D2) is a compound represented by any one of the following formulae (I) to (III), in which $\lambda_{max(D2)}$ is within a wavelength range of 720 nm to 770 nm. $\lambda_{max(D2)}$ is preferably within a wavelength range of 720 nm to 760 nm, more preferably within a wavelength range of 740 nm to 760 nm. Furthermore, as for the dye (D2), in terms of the relationship with the dye (D1), a compound where $\lambda_{max(D2)}-\lambda_{max(D1)}$ is 30 nm or more and 85 nm or less is used. $\lambda_{max(D2)}-\lambda_{max(D1)}$ is more preferably 35 nm or more and 80 nm or less.

The dye (D2) is preferably selected from the compounds represented by the following formulae (II-3), (III-1) and (III-2), because the transmittance of visible light, particularly, blue light, is high, $\lambda_{max(D2)}$ is within more preferable range, and the light resistance is excellent.

[Chem. 20]

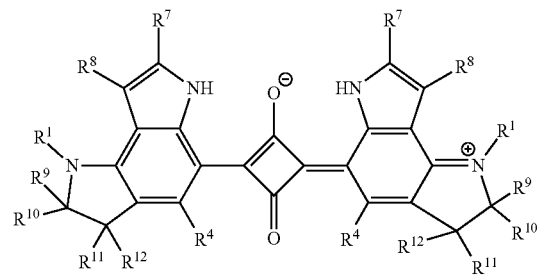

(II-3)

In the formula (II-3), each of $R^1$, $R^4$ and $R^9$ to $R^{12}$ independently represents a hydrogen atom, a halogen atom, or an alkyl group including 1 to 15 carbon atoms which may include a substituent, and each of $R^7$ and $R^8$ independently represents a hydrogen atom, a halogen atom, or an alkyl group including 1 to 5 carbon atoms which may include a substituent.

[Chem. 21]

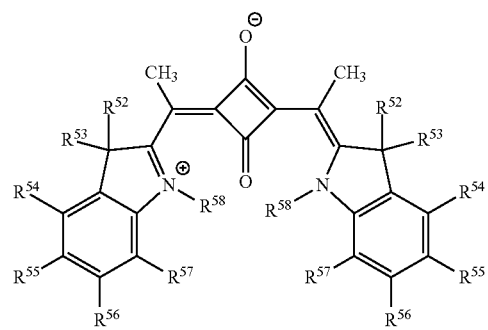

(III-1)

-continued

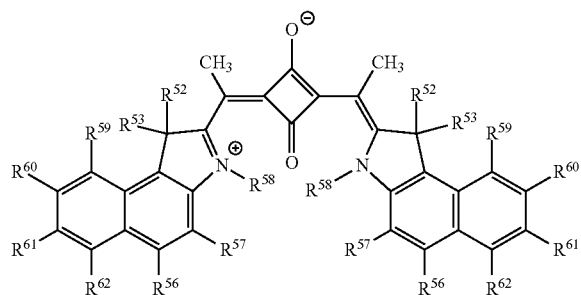

(III-2)

In the formulae (III-1) and (III-2), each of $R^{52}$ to $R^{62}$ independently represents a hydrogen atom, a halogen atom, or an alkyl group including 1 to 10 carbon atoms which may include a substituent.

In the compound (II-3), in view of solubility in the transparent resin, visible light transmission, etc., $R^1$ is independently, preferably an alkyl group including 1 to 15 carbon atoms, more preferably an alkyl group including 1 to 10 carbon atoms, still more preferably an ethyl group or an isopropyl group.

In view of visible light transmission and ease of synthesis, $R^4$ is preferably a hydrogen atom or a halogen atom, more preferably a hydrogen atom. $R^7$ and $R^8$ are independently, preferably a hydrogen atom, a halogen atom, or an alkyl group including 1 to 5 carbon atoms which may be substituted by a halogen atom, more preferably a hydrogen atom, a halogen atom, or a methyl group.

$R^9$ to $R^{12}$ are independently, preferably a hydrogen atom, a halogen atom, or an alkyl group including 1 to 5 carbon atoms which may be substituted by a halogen atom. —$CR^9R^{10}$—$CR^{11}R^{12}$— includes the groups (11-1) to (11-3) described above and a divalent organic group represented by the following formula (11-5):

—C(CH$_3$)(CH$_2$—CH(CH$_3$)$_2$)—CH(CH$_3$)— (11-5)

Examples of the compound (II-3) include, more specifically, compounds shown in Table 5 below.

TABLE 5

| Abbr. of Dye | Substituent —$CR^9R^{10}$—$CR^{11}R^{12}$— | $R^1$ | $R^4$ | $R^7$ | $R^8$ |
|---|---|---|---|---|---|
| II-3-1 | (11-1) | —C$_2$H$_5$ | H | H | H |
| II-3-2 | (11-5) | —C$_2$H$_5$ | H | H | H |
| II-3-3 | (11-1) | —CH(CH$_3$)$_2$ | H | H | —CH$_3$ |

In the compounds (III-1) and (III-2), $R^{52}$ and $R^{53}$ are independently, preferably a hydrogen atom, a halogen atom, or an alkyl group including 1 to 6 carbon atoms which may be substituted by a halogen atom, more preferably a hydrogen atom, a halogen atom, or a methyl group. $R^{58}$ is preferably a hydrogen atom, a halogen atom, or an alkyl group including 1 to 6 carbon atoms which may be substituted by a halogen atom and in view of ease of synthesis, more preferably an alkyl group including 1 to 3 carbon atoms. Each of $R^{54}$, $R^{55}$, $R^{56}$, $R^{57}$ and $R^{59}$ to $R^{62}$ is independently, preferably a hydrogen atom, a halogen atom, or an alkyl group including 1 to 6 carbon atoms which may include a substituent and in view of ease of synthesis, more preferably a hydrogen atom. Examples of the compound (III-1) and the compound (III-2) include, more specifically, compounds shown in Table 6 and Table 7 below, respectively.

TABLE 6

| Abbr. of Dye | Substituent | | | | | | |
|---|---|---|---|---|---|---|---|
| | $R^{52}$ | $R^{53}$ | $R^{54}$ | $R^{55}$ | $R^{56}$ | $R^{57}$ | $R^{58}$ |
| III-1-1 | —CH$_3$ | —CH$_3$ | H | H | H | H | H |
| III-1-2 | —CH$_3$ | —CH$_2$CH(CH$_3$)$_2$ | H | —CH$_3$ | H | H | H |

TABLE 7

| Abbr. of Dye | Substituent | | | | | | | | |
|---|---|---|---|---|---|---|---|---|---|
| | $R^{52}$ | $R^{53}$ | $R^{56}$ | $R^{57}$ | $R^{58}$ | $R^{59}$ | $R^{60}$ | $R^{61}$ | $R^{62}$ |
| III-2-1 | —CH$_3$ | —CH$_3$ | H | H | H | H | H | H | H |

Among the compounds (I-4), for example, compounds where $R^{21}$ and $R^{22}$ are an aryl or alaryl group including 6 to 11 carbon atoms which may include a substituent can be used as the dye (D2). Examples of the substituent include a halogen atom and an alkoxy group including 1 to 15 carbon atoms. The carbon number of the aryl or alaryl group does not include the carbon number of the substituent.

In the case of using the compound (I-4) as the dye (D2) under the above-described conditions, $R^{24}$ is preferably —$NR^{27}R^{28}$. In view of solubility in the host solvent or transparent resin, —$NR^{27}R^{28}$ is preferably —NH—C(=O)—$R^{29}$. $R^{29}$ may be the same as $R^{29}$ in the compound (I-11), also as to preferred embodiments.

In the case of using the compound (I-4) as the dye (D2) under the above-described conditions, from the viewpoint of increasing the visible light transmittance, particularly, the transmittance of light at a wavelength of 430 nm to 550 nm, $R^{24}$ is preferably —NH—SO$_2$—$R^{30}$. $R^{30}$ may be the same as $R^{29}$ in the compound (I-12), also as to preferred embodiments.

Examples of the compound (I-4) usable as the dye (D2) include, more specifically, compounds shown in Table 8 below. In Table 8, -Ph- represents a 1,4-phenylene group, and —C$_4$H$_9$ represents a linear butyl group.

TABLE 8

| Abbr. of Dye | Substituent | | | | | | | |
|---|---|---|---|---|---|---|---|---|
| | $R^{21}$ | $R^{22}$ | $R^{23}$ | $R^{24}$ | $R^{29}$ | $R^{30}$ | $R^{25}$ | $R^{26}$ |
| I-4-1 | —Ph—OCH$_3$ | —Ph—OCH$_3$ | H | —NH—SO$_2$—$R^{30}$ | — | —CH$_2$(CH$_2$)$_6$CH$_3$ | H | H |
| I-4-2 | —Ph—C$_4$H$_9$ | —Ph—C$_4$H$_9$ | H | —NH—C(=O)—$R^{29}$ | (2c) | — | H | H |

In the dye (D2), $\lambda_{max(D2)}$ is within a wavelength range of 720 nm to 770 nm, and the dye is used in such a combination that, in terms of the relationship with the dye (D1), $\lambda_{max(D2)}-\lambda_{max(D1)}$ is 30 nm or more and 85 nm or less. Furthermore, in the dye (D2), the mass absorption constant when the dye (D2) is contained in the transparent resin is preferably 1,000/(cm·mass %) or more, more preferably 1,500/(cm·mass %) or more.

Among the compounds (I) to (III), compounds in which, in a spectral transmittance curve over a wavelength range of 400 nm to 1,100 nm as measured in a state of the compound being contained in the transparent resin, the maximum absorption wavelength $\lambda_{max}$ is within the range of 720 nm to 730 nm and the difference between a wavelength $\lambda_{SH80}$ at which the transmittance is 80% on the shorter wavelength side than $\lambda_{max}$ when the concentration is adjusted such that a transmittance at $\lambda_{max}$ is 10%, and the maximum absorption wavelength $\lambda_{max}$ is 100 nm or less, can be used as the dye (D1) and can also be used as the dye (D2).

With respect to the squarylium compound represented by any one of the formulae (I) to (III) described above, the characteristics of the spectral transmittance curve over a wavelength range of 400 nm to 1,100 nm as measured in a state of the dye being contained in the transparent resin are shown in Table 9. Specifically, squarylium dyes (D1) and (D2), a polyimide resin C3G30 (trade name, produced by Mitsubishi Gas Chemical Company, Inc.), and cyclohexanone were added and then uniformly dissolved by thorough stirring. Using the obtained solution, an NIR dye-containing resin layer having a film thickness of 1.0 μm was formed on a glass plate (D263, manufactured by SCHOTT AG). In regard to the transparent resin, as long as the later-described transparency requirement is satisfied, the same optical properties are obtained by using any transparent resin.

The added amount of the squarylium compound in the transparent resin is adjusted such that the transmittance at the maximum absorption wavelength $\lambda_{max}$ is 10%. The spectral transmittance curve of the NIR dye-containing resin layer is obtained using the spectral transmittance curve of a glass plate with the NIR dye-containing resin layer in a wavelength range of 400 nm to 1,100 nm and the spectral transmittance curve of the glass plate in a wavelength range of 400 nm to 1,100 nm.

In Table 9, T435-480 and T590-630 respectively indicate an average transmittance of light at a wavelength of 435 to 480 nm and an average transmittance of light at a wavelength of 590 nm to 630 nm. $\lambda_{max}$ and $\lambda_{SH80}$ are as described above, and the absorption constant indicates a mass absorption constant [/(cm·mass %)] when the dye is contained in the transparent resin. In Table 9, when each compound is usable as the dye (D1) or the dye (D2), this is indicated by "A", and when not usable, indicated by "C".

For comparison, optical properties of commercially available phthalocyanine compounds and cyanine compounds measured in the same manner as above are shown. As for symbols in Structure of Table 9, "SQ", "PC", and "Cy" stand for a squarylium compound, a phthalocyanine compound, and a cyanine compound, respectively. The abbreviation of dye is a trade name (produced by Yamada Chemical Co., Ltd.) in the case of phthalocyanine compounds and is a trade name (produced by FEW CHEMICAL) in the case of cyanine compounds. With respect to four kinds of cyanine compounds, the structural formulae are shown below.

[Chem. 22]

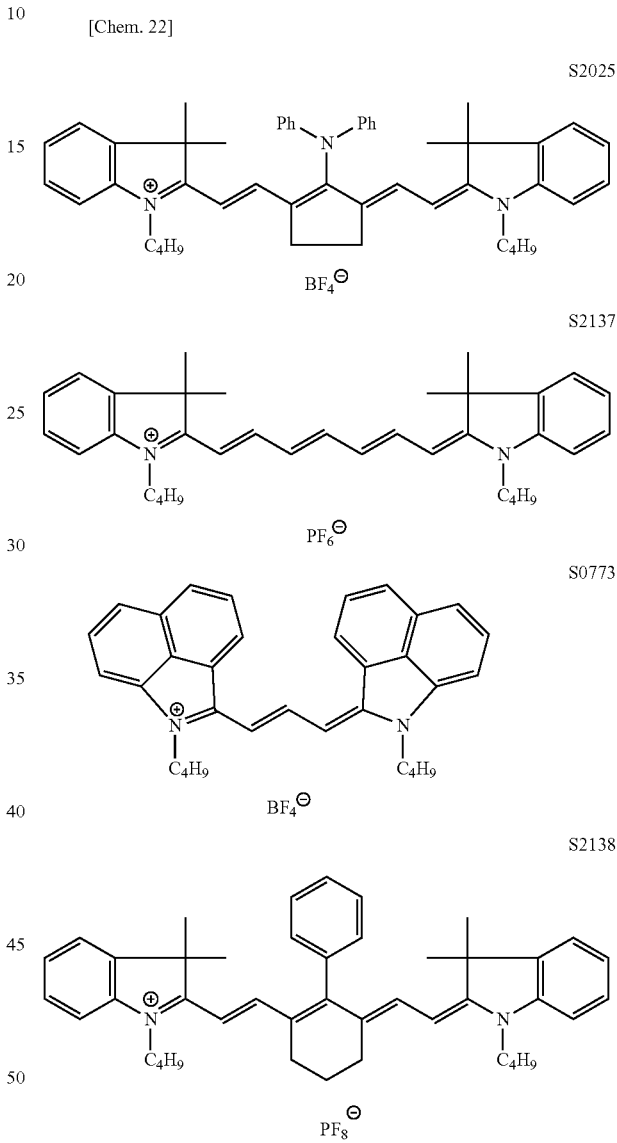

TABLE 9

| Abbr. of Dye | T435-480 % | T590-630 % | $\lambda_{max}$ nm | $\lambda_{SH80}$ nm | $\lambda_{max} - \lambda_{SH80}$ nm | Structure | Use as Dye (D1) | Use as Dye (D2) | Absorption Constant/ cm · mass % |
|---|---|---|---|---|---|---|---|---|---|
| I-11-7 | 96.3 | 92.0 | 715 | 639 | 76 | SQ | A | C | 2941 |
| I-11-14 | 95.8 | 85.5 | 705 | 622 | 83 | SQ | A | C | 2060 |
| I-11-15 | 95.7 | 95.2 | 723 | 649 | 74 | SQ | A | A | 2021 |
| I-12-15 | 97.2 | 89.7 | 707 | 631 | 76 | SQ | A | C | 2524 |
| I-12-23 | 97.3 | 93.1 | 713 | 640 | 73 | SQ | A | C | 1872 |
| II-1-7 | 97.8 | 94.1 | 716 | 644 | 72 | SQ | A | C | 3116 |
| II-1-10 | 98.0 | 93.1 | 714 | 640 | 74 | SQ | A | C | 3862 |
| II-2-3 | 97.7 | 95.2 | 725 | 653 | 72 | SQ | A | A | 2335 |

TABLE 9-continued

| Abbr. of Dye | T435-480 % | T590-630 % | $\lambda_{max}$ nm | $\lambda_{SH80}$ nm | $\lambda_{max} - \lambda_{SH80}$ nm | Structure | Use as Dye (D1) | Use as Dye (D2) | Absorption Constant/ cm · mass % |
|---|---|---|---|---|---|---|---|---|---|
| II-2-4 | 95.5 | 95.1 | 727 | 655 | 72 | SQ | A | A | 1702 |
| I-4-1 | 87.9 | 90.1 | 733 | 634 | 99 | SQ | C | A | — |
| I-4-2 | 68.4 | 87.7 | 741 | 635 | 106 | SQ | C | A | — |
| II-3-1 | 96.8 | 95.2 | 751 | 663 | 88 | SQ | C | A | 3047 |
| II-3-2 | 96.9 | 96.0 | 752 | 667 | 85 | SQ | C | A | 2577 |
| III-2-1 | 92.2 | 89.8 | 769 | 649 | 120 | SQ | C | A | 1323 |
| III-1-2 | 94.8 | 89.8 | 749 | 644 | 105 | SQ | C | A | — |
| FDR-005 | 83.4 | 80.8 | 727 | 612 | 115 | PC | C | C | 401 |
| FDR-004 | 93.4 | 68.4 | 720 | 593 | 127 | PC | C | C | 424 |
| S2137 | 96.1 | 84.7 | 763 | 623 | 140 | Cy | C | C | 1746 |
| S2138 | 95.1 | 91.3 | 776 | 647 | 129 | Cy | C | C | 1907 |
| S0773 | 93.1 | 85.4 | 778 | 622 | 156 | Cy | C | C | 1176 |
| S2025 | 96.1 | 87.4 | 809 | 657 | 152 | Cy | C | C | 1458 |

Each of the compounds (I) to (III) can be produced by a common method. With respect to the compound (I), the compound (I-11) can be produced, for example, by the method described in U.S. Pat. No. 5,543,086. The compound (I-12) can be produced, for example, by the methods described in U.S. Patent Application Publication No. 2014/0061505 and International Publication No. 2014/088063. The compound (II) can be produced by the method described in International Publication No. 2017/135359.

In a spectral transmittance curve over a wavelength range of 400 nm to 1,100 nm as measured in a state of the dye (D1) and the dye (D2) contained in the transparent resin at such a concentration that when each dye is contained alone in the transparent resin, the transmittance at $\lambda_{max(D1)}$ and $\lambda_{max(D2)}$ is 10%, it is preferable to satisfy (i-1) to (i-3). More specifically, firstly, concentration conditions under which when each of the dye (D1) and the dye (D2) is contained alone in the transparent resin, the transmittance at $\lambda_{max(D1)}$ and $\lambda_{max(D2)}$ is 10% are determined. Then, in a spectral transmittance curve over a wavelength range of 400 nm to 1,100 nm as measured in a state of both of the dye (D1) and the dye (D2) being contained in the transparent resin under the concentration conditions determined above, it is preferable to satisfy (i-1) to (i-3).

(i-1) The spectral transmittance curve shows two wavelengths at which the transmittance for light is 20% within a wavelength range of 650 nm to 800 nm, and the difference between the two wavelengths is 70 nm or more.

(i-2) The maximum transmittance for light in a wavelength range from the maximum absorption wavelength $\lambda_{max(D1)}$ to the maximum absorption wavelength $\lambda_{max}$ (D1)+50 nm is 20% or less.

(i-3) The average transmittance for light in a wavelength range from the maximum absorption wavelength $\lambda_{max(D1)}-20$ nm to the maximum absorption wavelength $\lambda_{max(D1)}+80$ nm is 30% or less.

In the transparent resin layer containing the dye (D1) and the dye (D2) under the above-described concentration conditions, the absorption peak (hereinafter, sometimes referred to as "absorption peak (D1·D2)") is preferably one wide absorption band. In (i-1), in the case where the spectral transmittance curve shows two wavelengths at which the transmittance is 20% in a wavelength range of 650 nm to 800 nm, it is indicated that the layer has the one wide absorption band. In the case where the difference between two wavelengths at which the transmittance is 20% is 70 nm or more, the capability of reducing incident angle dependence of the reflection layer is increased. The difference between the wavelengths is more preferably 80 nm or more, still more preferably 90 nm or more.

In the case where (i-2) the maximum transmittance in a wavelength range from $\lambda_{max(D1)}$ to $\lambda_{max(D1)}+50$ nm is 20% or less, it is indicated that the transmittance on the shorter wavelength side is small in the absorption peak (D1·D2). The maximum transmittance above is more preferably 15% or less, still more preferably 12% or less, yet still more preferably 10% or less.

In the case where (i-3) the average transmittance for light in a wavelength range from $\lambda_{max(D1)}-20$ nm to the maximum absorption wavelength $\lambda_{max(D1)}+80$ nm is 30% or less, the absorption peak (D1·D2) can be said to have a wide low-transmittance area. The average transmittance is preferably 25% or less, more preferably 20% or less, still more preferably 15% or less, yet still more preferably 12% or less, even yet still more preferably 10% or less.

With respect to the dyes (D1) and (D2) used in the absorption layer, in a spectral transmittance curve over a wavelength range of 400 nm to 1,100 nm as measured in the transparent resin layer containing the dyes (D1) and (D2) under the above-described concentration conditions, it is preferable to further satisfy the following (i-4).

(i-4) The average transmittance of light at a wavelength of 400 nm to 500 nm is 85% or more.

In (i-4), the average transmittance of light at a wavelength of 400 nm to 500 nm is more preferably 86% or more, still more preferably 88% or more, yet still more preferably 90% or more.

In the foregoing pages, the dye (D1) and the dye (D2) are described. Each of the dye (D1) and the dye (D2) may be composed of one kind of a compound or may be composed of two or more kinds of compounds. In the case of being composed of two or more kinds of compounds, it is not necessary for individual compounds to have the properties of the dye (D1) and the dye (D2), and only a mixture of the compounds must have respective properties of the dye (D1) and the dye (D2). However, in view of operating efficiency, each of the dye (D1) and the dye (D2) is preferably composed of one kind of a compound.

The absorption layer is typically a layer or (resin) substrate where the dyes (D1) and (D2) are evenly dissolved or dispersed in the transparent resin. The absorption layer may contain other NIR dyes, in addition to the dyes (D1) and (D2), as long as the effects of the present invention are not impaired. Furthermore, the absorption layer may contain a dye other than the NIR dye, particularly, a UV dye, as long as the effects of the present invention are not impaired.

Specific examples of the UV dye include oxazole-based, merocyanine-based, cyanine-based, naphthalimide-based, oxadiazole-based, oxazine-based, oxazolidine-based, naphthalic acid-based, styryl-based, anthracene-based, cyclic carbonyl-based and triazole-based dyes. Among these, oxazole-based and merocyanine-based dyes are preferred. In addition, one of these UV dyes may be used alone in the absorption layer, or two or more thereof may be used in combination.

The transparent resin is not limited to a particular kind as long as it is a resin transmitting light at a wavelength of 400 nm to 900 nm. Since the transparent resin has such a property, the above-described evaluation of the dyes (D1) and (D2) can be performed without taking into account the absorption of the transparent resin.

Examples of the transparent resin include an acrylic resin, an epoxy resin, an ene.thiol resin, a polycarbonate resin, a polyether resin, a polyarylate resin, a polysulfone resin, a polyethersulfone resin, a polyparaphenylene resin, a polyarylene ether phosphine oxide resin, a polyamide resin, a polyimide resin, a polyamideimide resin, a polyolefin resin, a cyclic olefin resin, a polyurethane resin, a polystyrene resin, and a polyester resin (e.g., polyethylene terephthalate resin, polyethylene naphthalate resin), etc. One of these resins may be used alone, or two or more thereof may be mixed and used.

In view of the transparency, solubility of the dyes (D1) and (D2), and heat resistance, the transparent resin is preferably a resin having a high glass transition point (Tg). Specifically, one or more resins selected from a polyester resin, a polycarbonate resin, a polyethersulfone resin, a polyarylate resin, a polyimide resin, and an epoxy resin are preferred, and one or more resins selected from a polyester resin and a polyimide resin are more preferred.

The absorption layer may further contain, as long as the effects of the present invention are not impaired, an optional component such as adhesion-imparting agent, color tone correcting dye, leveling agent, antistatic agent, heat stabilizer, light stabilizer, antioxidant, dispersing agent, flame retardant, lubricant and plasticizer.

In the absorption layer, the shorter wavelength-side wavelength $\lambda_{AB-SHT20}$ of the wavelength at which the transmittance is 20% for light at an incident angle of 0° is preferably in a wavelength range of 650 nm to 720 nm. In the optical filter including a reflection layer, it is preferred that the relationship of $\lambda_{AB-SHT20}$ with the shorter wavelength-side wavelength $\lambda_{RE-SHT20}$ at which the transmittance for light with an incident angle of 0° is 20% in the reflection layer satisfies (ii-1):

(ii-1) $\lambda_{AB-SHT20}+30$ nm$\leq\lambda_{RE-SHT20}\leq$790 nm

In the absorption layer, each of the contents of the dyes (D1) and (D2) is appropriately selected depending on the design of the optical filter, for example, so as to satisfy the properties (ii-1) in terms of the relationship with the reflection layer or satisfy the later-described properties (iii-1) to (iii-3) as an optical filter.

In the absorption layer, from the viewpoint of blocking near-infrared light and reducing the incident angle dependence of the reflection layer for light incident at a high incident angle while ensuring transmittance of visible light, particularly, blue light, the total content of the dyes (D1) and (D2) is preferably from 0.01 to 20 parts by mass per 100 parts by mass of the transparent resin.

In the present filter, the thickness of the absorption layer is preferably from 0.1 to 100 µm. In the case where the absorption layer is composed of a plurality of layers, the total thickness of respective layers is preferably 0.1 µm to 100 µm. If the thickness is less than 0.1 µm, desired optical properties may not be sufficiently obtained, and if the thickness exceeds 100 µm, the flatness of the layer may be reduced to cause in-plane variation of the absorption rate. The thickness of the absorption layer is more preferably from 0.3 µm to 50 µm. Furthermore, in the case of including other functional layers such as a reflection layer and an antireflection layer, if the absorption layer is too thick, breaking, etc. may occur depending on the material. Accordingly, the thickness of the absorption layer is still more preferably from 0.3 µm to 10 µm.

The absorption layer can be formed, for example, by dissolving or dispersing the dyes (D1) and (D2), the transparent resin or raw material components of the transparent resin, and respective components blended, if desired, in a solvent to prepare a coating solution, applying the coating solution onto a substrate, drying it, and furthermore, curing the coating, if desired. The substrate may be a transparent substrate included in the present filter or a releasable substrate used only when the absorption layer is formed. The solvent may be a dispersion medium capable of stably dispersing the components or a solvent capable of dissolving the components.

The coating solution may contain a surfactant so as to improve, for example, voids due to microbubble, dents due to adherence of foreign matters, etc., and crawling in the drying step. In addition, to apply the coating solution, for example, an immersion coating method, a cast coating method, and a spin coating method can be used. The above-described coating solution is applied onto the substrate and then dried to form the absorption layer. Furthermore, in the case where the coating solution contains raw material components of the transparent resin, a curing treatment such as thermal curing and photo-curing is further performed.

The absorption layer can also be produced in a film form by extrusion molding, and the film may be stacked on another member and integrated by thermocompression, etc. For example, in the case where the present filter includes a transparent substrate, the film may be attached onto the transparent substrate.

The present filter may include one absorption layer or two or more absorption layers. In the case of including two or more layers, respective layers may have the same configuration or different configurations. As an example, it is acceptable that while one layer is formed as a near-infrared absorption layer containing the dyes (D1) and (D2) and a transparent resin, another layer is formed as a near-ultraviolet absorption layer containing an UV dye and a transparent resin. As another example, it is acceptable that while one layer is formed as a first near-infrared absorption layer containing the dye (D1) and a transparent resin, another layer is formed as a second near-infrared absorption layer containing the dye (D2), an UV dye and a transparent resin. In addition, the absorption layer may be a layer functioning as a substrate (resin substrate) by itself.

Transparent Substrate

In the case of using a transparent substrate for the present filter, the material constituting the transparent substrate is not particularly limited as long as it transmits visible light at a wavelength of approximately from 400 nm to 700 nm, and the material may be a material absorbing near-infrared light or near-ultraviolet light. Examples of the material include an inorganic material such as glass and crystal, and an organic material such as a transparent resin.

Examples of the glass that can be used for the transparent substrate include absorption glass made by adding copper ions to fluorophosphate-based glass, phosphate-based glass, etc. (near-infrared absorbing glass substrate), soda lime glass, borosilicate glass, non-alkali glass, quartz glass, etc. The glass is preferably an absorption glass, because near-infrared light on the longer wavelength side than the dye (D2) can be absorbed. The "phosphate-based glass" encompasses silicophosphate glass in which a part of the glass skeleton is composed of $SiO_2$.

As the glass, a chemically strengthened glass obtained by exchanging an alkali metal ion having a small ion radius (e.g., Li ion, Na ion) present in the principal surface of a glass plate with an alkali ion having a larger ion radius (for example, Na ion or K ion for Li ion, and K ion for Na ion) through ion exchange may be used.

Examples of the transparent resin material usable as the transparent substrate include a polyester resin such as polyethylene terephthalate and polybutylene terephthalate, a polyolefin resin such as polyethylene, polypropylene and ethylene-vinyl acetate copolymer, a norbornene resin, an acrylic resin such as polyacrylate and polymethyl methacrylate, a urethane resin, a vinyl chloride resin, a fluororesin, a polycarbonate resin, a polyvinyl butyral resin, a polyvinyl alcohol resin, a polyimide resin, etc.

Examples of the crystal material usable for the transparent substrate include a birefringent crystal such as quartz crystal, lithium niobate and sapphire. As for the optical properties of the transparent substrate, it is preferable to have the above-described optical properties as an optical filter obtained by lamination of the absorption layer, reflection layer, etc. The crystal material is preferably sapphire.

In view of, for example, shape stability relating to long-term reliability of optical properties, mechanical properties, etc. as an optical filter, and handleability in manufacturing of a filter, the transparent substrate is preferably an inorganic material, more preferably glass or sapphire.

The shape of the transparent substrate is not particularly limited and may have a block shape, a plate shape, or a film shape, and the thickness thereof is preferably, for example, from 0.03 mm to 5 mm and in view of thickness reduction, more preferably from 0.03 mm to 0.5 mm. From the viewpoint of processability, a transparent substrate composed of a plate-shaped glass, having a plate thickness of 0.05 mm to 0.5 mm, is preferred.

Reflection Layer

The reflection layer includes a dielectric multilayer film and has a function of blocking light in a specific wavelength region. Examples of the reflection layer include a layer having wavelength selectivity of transmitting visible light and mainly reflecting light at a wavelength outside the light blocking region of the absorption layer. The reflection layer preferably has a reflection region of reflecting near-infrared light. In this case, the reflection region of the reflection layer may include a light blocking region in the near-infrared region of the absorption layer. The properties of the reflection layer are not limited to the above-described properties and the reflection layer may be appropriately designed to a configuration in which light in a predetermined wavelength region, for example, a near-ultraviolet region, is further blocked.

In the case where the reflection layer has a reflection region of reflecting near-infrared light, the absorption layer and the reflection layer preferably have the following relationship.

It is preferred that as for the absorption layer, the shorter wavelength-side wavelength $\lambda_{AB\text{-}SHT20}$ of the wavelength at which the transmittance is 20% in the absorption region at an incident angle of 0° is within a wavelength range of from 650 nm to 720 nm and as for the reflection layer, the shorter wavelength-side wavelength $\lambda_{RE\text{-}SHT20}$ at which the transmittance is 20% in the reflection region at an incident angle of 0° satisfies (ii-1).

(ii-1) $\lambda_{AB\text{-}SHT20}+30$ nm $\leq \lambda_{RE\text{-}SHT20} \leq 790$ nm.

The reflection layer preferably further satisfies (ii-2).

(ii-2) The average transmittance for light in a wavelength range from $\lambda_{RE\text{-}SHT20}$ to $\lambda_{RE\text{-}SHT20}+300$ nm is 10% or less.

In the present filter, the absorption layer contains the dyes (D1) and (D2) having properties of (1) to (3), and a wide absorption band having one absorption band in the near-infrared region can be thereby imparted. Consequently, the degree of freedom in designing $\lambda_{RE\text{-}SHT20}$ of the reflection layer can be wide as represented by (ii-1). In addition, the incident angle dependence for light incident at a high incident angle in the reflection layer can be reduced by the absorption layer.

The reflection layer includes a dielectric multilayer film formed by alternately stacking low-refractive-index dielectric films (low-refractive-index films) and high-refractive-index dielectric films (high-refractive-index films). The high-refractive-index film preferably has a refractive index of 1.6 or more, more preferably from 2.2 to 2.5. Examples of the material of the high-refractive-index film include $Ta_2O_5$, $TiO_2$, and $Nb_2O_5$. Among these, $TiO_2$ is preferred in view of reproducibility, stability, etc. with respect to film formability, refractive index, etc.

On the other hand, the low-refractive-index film preferably has a refractive index of less than 1.6, more preferably 1.45 or more and less than 1.55. Examples of the material of the low-refractive-index film include $SiO_2$ and $SiO_xN_y$. In view of reproducibility, stability, profitability, etc. with respect to film formability, $SiO_2$ is preferred.

Furthermore, in the reflection layer, it is preferred that the transmittance steeply changes in a boundary wavelength range between the transmission region and the light blocking region. For this purpose, the total number of stacks of the dielectric multilayer film constituting the reflection layer is preferably 15 or more, more preferably 25 or more, still more preferably 30 or more. However, if the total number of stacks is large, warping, etc. may occur, and the film thickness may increase. Accordingly, the total number of stacks is preferably 100 or less, more preferably 75 or less, still more preferably 60 or less. In addition, the thickness of the dielectric multilayer film is preferably from 2 μm to 10 μm.

In the case where the total number of stacks and thickness of the dielectric multilayer film are in the ranges above, the reflection layer can satisfy the steepness of transmittance in the boundary wavelength range between the transmission region and the light blocking region while satisfying the miniaturization requirement and maintaining high productivity. In addition, for the formation of the dielectric multilayer film, for example, a vacuum film-forming process such as CVD method, sputtering method and vacuum deposition method, or a wet film-forming process such as spray method and dip method can be used.

The reflection layer may provide predetermined optical properties in a single layer (a group of dielectric multilayer films) or may provide predetermined optical properties in two layers. In the case of providing two or more reflection layers, respective reflection layers may have the same configuration or different configurations. In the case of providing two or more reflection layers, the reflection layer is usually constituted by a plurality of reflection layers differing in the reflection band.

For example, in the case of providing two reflection layers, it is acceptable that while one layer is formed as a near-infrared reflection layer for blocking light in the shorter wavelength band of the near infrared region, another layer is formed as a near-infrared/near-ultraviolet reflection layer for blocking light in both ranges of the long wavelength band of the near-infrared region and the near-ultraviolet region. In addition, for example, in the case where the present filter includes a transparent substrate and two or more reflection layers are provided, all layers may be provided on one principal surface of the transparent substrate, or respective reflection layers may be provided on both principal surfaces of the transparent substrate such that the transparent substrate is in between the layers.

Antireflection Layer

Examples of the antireflection layer include a dielectric multilayer film, an intermediate-refractive-index medium, and a moth-eye structure, which gradually varies the refractive index. Among others, a dielectric multilayer film is preferred in view of optical efficiency and productivity. The antireflection layer is obtained, similarly to the reflection layer, by alternately stacking dielectric films.

The present filter may include, as other components, for example, a component (layer) giving absorption by inorganic fine particles, etc. which control transmission and absorption of light in a specific wavelength region. Specific examples of the inorganic fine particle include ITO (Indium Tin Oxides), ATO (Antimony-doped Tin Oxides), cesium tungstate, and lanthanum boride. The ITO fine particles and cesium tungstate fine particles have high visible light transmittance and a wide range of light absorbing property in the infrared wavelength range exceeding 1,200 nm and therefore, can be used in the case where a blocking property for such infrared light is required.

The present filter includes a reflection layer and an absorption layer containing the dyes (D1) and (D2), thereby realizing excellent near-infrared light-blocking property, reduction in the incident angle dependence for light incident at a high incident angle, high transmittance of visible light including blue light, and excellent light resistance.

The present filter preferably satisfies, specifically, the following optical properties (iii-1) to (iii-3).

(iii-1) The average of differences in the transmittances of incident light with an incident angle of 0° and incident light with an incident angle of 35° in a wavelength range of 703 nm to 739 nm is 10%/nm or less.

(iii-2) The average transmittance in a wavelength range of 400 nm to 500 nm is 75% or more.

(iii-3) The maximum transmittance in a wavelength range of 713 nm to 763 nm is 20% or less.

The average of differences in the transmittances in (iii-1) is more preferably 8%/nm or less, still more preferably 5%/nm or less. The average of differences in the transmittances in (iii-1) corresponds to a result from taking a difference (absolute value of difference) between the transmittance of incident light with an incident angle of 0° and the transmittance of incident light with an incident angle of 35° every 1 nm in a wavelength range of 703 nm to 739 nm and dividing the total transmittance [%] of these differences by the number of wavelengths sampled (=37). The average transmittance in (iii-2) is more preferably 80% or more. The maximum transmittance in (iii-3) is more preferably 15% or less, still more preferably 12% or less.

In the case where the present filter is used, for example, for an imaging device such as digital still camera, an imaging device excellent in color reproducibility can be provided. An imaging device using the present filter includes a solid-state image sensing device, an imaging lens, and the present filter. The present filter can be used, for example, by disposing it between the imaging lens and the solid-state image sensing device or by directly attaching it to the solid-state image sensing device, imaging lens, etc. of the imaging device via an adhesive layer.

EXAMPLES

Examples of the present invention are described below. First, exemplary combinations of the dyes (D1) and (D2) used for the absorption layer of the present filter are described. After that, Examples of the optical filter are described.

Cases D-1 to D-15

The combination of dyes (D1) and (D2) contained in the absorption layer of the present filter was studied by combining various compounds shown in Table 9 above. In Table 10, Cases D-1 to D-7, D-14 and D-15 indicate the combinations as Examples of the invention. Furthermore, in Table 11, Cases D-8 to D-13 indicate Comparative Examples in which dye (1-12-23) corresponding to the dye (D1) of the present invention and a dye (Dx) not corresponding to the dye (D2) are combined.

The dye (D1), the dye (D2) or dye (Dx), shown in Tables 10 and 11, a polyimide resin C3G30 (trade name; produced by Mitsubishi Gas Chemical Company, Inc.), and cyclohexanone were thoroughly stirred and thereby uniformly dissolved. The obtained solution was applied onto a glass plate (D263, manufactured by SCHOTT AG) and dried to obtain an absorption layer having a film thickness of 1.0 μm. As for two kinds of dyes, the amount added of each dye was adjusted such that the light transmittance at the maximum absorption wavelength is 10% when the dye is added alone to the polyamide resin C3G30. The spectral transmittance curve of the absorption layer was obtained using the spectral transmittance curves over a wavelength of 400 nm to 1,100 nm of a glass plate with an absorption layer and the glass plate.

From the spectral transmittance curve of the absorption layer, each item in Tables 10 and 11 was evaluated. Each item means the following. However, as for the items described above, description is omitted.

(i-1) $\lambda_{AB-LOT20} - \lambda_{AB-SHT20}$:

$\lambda_{AB-LOT20} - \lambda_{AB-SHT20}$ is an indicator of the requirement of (i-1). This indicates a difference between $\lambda_{AB-LOT20}$ and $\lambda_{AB-SHT20}$, in which out of two wavelengths at which the transmittance of light is 20% in a wavelength range of 650 nm to 800 nm, the wavelength on the shorter wavelength side is denoted by $\lambda_{AB-SHT20}$ and the wavelength on the longer wavelength side is denoted by $\lambda_{AB-LOT20}$. In Cases D-1 to D-12, D-14 and D-15, the number of wavelengths at which the transmittance of light is 20% in a wavelength range of 650 nm to 800 nm was two. In Case D-13, out of light wavelengths at which the transmittance was 20%, the wavelength on the long wavelength side exceeded 800 nm.

(i-2) Maximum Transmittance

Maximum transmittance is an indicator of the requirement of (i-2). This indicates the maximum transmittance of light in a wavelength range from $\lambda_{max(D1)}$ to $\lambda_{max(D1)}+50$ nm.

(i-3) Average Transmittance

Average transmittance is an indicator of the requirement of (i-3). This indicates the average transmittance of light in a wavelength range from $\lambda_{max(D1)}-20$ nm to $\lambda_{max(D1)}+80$ nm.

(i-4) $T400\text{-}500_{ave}$ $T400\text{-}500_{ave}$ is an indicator of the requirement of (i-4). This indicates the average transmittance of light at a wavelength of 400 nm to 500 nm.

$T500\text{-}600_{ave}$: This indicates the average transmittance of light at a wavelength of 500 nm to 600 nm.

$T600\text{-}700_{ave}$: This indicates the average transmittance of light at a wavelength of 600 nm to 700 nm.

$T700\text{-}730_{ave}$: This indicates the average transmittance of light at a wavelength of 700 nm to 730 nm.

$T700\text{-}750_{ave}$: This indicates the average transmittance of light at a wavelength of 700 nm to 750 nm.

Dye (D1) Content, Dye (D2) Content, Dye (Dx) Content:

These indicate the parts by mass of each dye per 100 parts by mass of the polyimide resin.

TABLE 10

|  | Case D-1 | Case D-2 | Case D-3 | Case D-4 | Case D-5 | Case D-6 | Case D-7 | Case D-14 | Case D-15 |
|---|---|---|---|---|---|---|---|---|---|
| Dye (D1) | I-12-15 | I-12-15 | I-12-23 | I-12-23 | I-11-7 | I-11-7 | II-2-4 | I-12-15 | I-12-23 |
| Dye (D2) | II-3-1 | III-2-1 | II-3-1 | III-2-1 | II-3-1 | III-2-1 | III-2-1 | II-3-2 | I-3-2 |
| Maximum transmittance in (i-2) [%] | 10.3 | 18.0 | 13.2 | 13.7 | 14.8 | 12.0 | 11.8 | 9.2 | 11.0 |
| (i-4) $T400\text{-}500_{ave}$ [%] | 90.4 | 85.3 | 93.5 | 88.1 | 92.5 | 87.1 | 86.7 | 92.3 | 92.3 |
| $T500\text{-}600_{ave}$ [%] | 96.6 | 93.1 | 97.3 | 93.8 | 96.9 | 93.5 | 93.3 | 97.9 | 97.9 |
| $T600\text{-}700_{ave}$ [%] | 54.0 | 50.1 | 59.1 | 54.7 | 58.1 | 53.8 | 61.4 | 64.6 | 64.6 |
| $T700\text{-}730_{ave}$ [%] | 6.2 | 6.4 | 5.3 | 5.1 | 5.2 | 4.8 | 7.2 | 6.6 | 6.6 |
| $\lambda_{AB\text{-}SHT20}$ [nm] | 683 | 681 | 688 | 686 | 688 | 686 | 696 | 695 | 695 |
| $\lambda_{AB\text{-}LOT20}$ [nm] | 769 | 785 | 769 | 785 | 769 | 785 | 785 | 770 | 770 |
| (i-1) $\lambda_{AB\text{-}LOT20} - \lambda_{AB\text{-}SHT20}$ [nm] | 86 | 104 | 81 | 99 | 81 | 99 | 89 | 75 | 75 |
| $T700\text{-}750_{ave}$ [%] | 7.5 | 10.4 | 5.8 | 7.7 | 5.2 | 6.7 | 6.1 | 5.3 | 5.3 |
| $\lambda_{max(D1)}$ [nm] | 707 | 707 | 713 | 713 | 715 | 715 | 727 | 707 | 713 |
| $\lambda_{max(D2)}$ [nm] | 751 | 769 | 751 | 769 | 751 | 769 | 769 | 752 | 752 |
| $\lambda_{max(D2)} - \lambda_{max(D1)}$ [nm] | 44 | 62 | 38 | 56 | 36 | 54 | 42 | 45 | 39 |
| Average transmittance in (i-3) [%] | 15.2 | 11.3 | 18.2 | 11.3 | 19.1 | 11.2 | 16.2 | 14.6 | 17.3 |
| Dye (D1) content [parts by mass] | 4.0 | 4.0 | 5.3 | 5.3 | 3.4 | 3.4 | 5.9 | 4.0 | 5.3 |
| Dye (D2) content [parts by mass] | 3.3 | 7.6 | 3.3 | 7.6 | 3.3 | 7.6 | 7.6 | 3.9 | 3.9 |
| Total of contents [parts by mass] | 7.3 | 11.6 | 8.6 | 12.9 | 6.7 | 11.0 | 13.5 | 7.9 | 9.2 |

TABLE 11

|  | Case D-8 | Case D-9 | Case D-10 | Case D-11 | Case D-12 | Case D-13 |
|---|---|---|---|---|---|---|
| Dye (D1) | I-12-23 | I-12-23 | I-12-23 | I-12-23 | I-12-23 | I-12-23 |
| Dye (Dx) | I-11-15 | II-2-4 | FDR-005 | S2137 | S0773 | S2025 |
| Maximum transmittance in (i-2) [%] | 78.9 | 70.6 | 72.9 | 9.5 | 16.2 | 25.8 |
| (i-4) $T400\text{-}500_{ave}$ [%] | 91.5 | 91.3 | 82.2 | 91.7 | 86.4 | 92.0 |
| $T500\text{-}600_{ave}$ [%] | 97.8 | 97.0 | 93.1 | 94.6 | 94.1 | 90.5 |
| $T600\text{-}700_{ave}$ [%] | 55.4 | 57.4 | 44.0 | 47.6 | 46.5 | 56.0 |
| $T700\text{-}730_{ave}$ [%] | 1.8 | 2.3 | 2.7 | 3.6 | 3.4 | 6.5 |
| $\lambda_{AB\text{-}SHT20}$ [nm] | 683 | 686 | 684 | 680 | 679 | 689 |
| $\lambda_{AB\text{-}LOT20}$ [nm] | 742 | 745 | 743 | 791 | 798 | none |
| (i-1) $\lambda_{AB\text{-}LOT20} - \lambda_{AB\text{-}SHT20}$ [nm] | 59 | 59 | 59 | 111 | 119 | — |
| $T700\text{-}750_{ave}$ [%] | 6.8 | 5.8 | 7.0 | 5.1 | 7.0 | 10.9 |
| $\lambda_{max(D1)}$ [nm] | 713 | 713 | 713 | 713 | 713 | 713 |
| $\lambda_{max(Dx)}$ [nm] | 723 | 727 | 763 | 778 | 778 | 809 |
| $\lambda_{max(Dx)} - \lambda_{max(D1)}$ [nm] | 10 | 14 | 50 | 65 | 65 | 96 |
| Average transmittance in (i-3) [%] | 40.0 | 37.6 | 37.8 | 8.4 | 9.3 | 15.2 |
| Dye (D1) content [parts by mass] | 5.3 | 5.3 | 5.3 | 5.3 | 5.3 | 5.3 |
| Dye (Dx) content [parts by mass] | 4.9 | 5.9 | 24.9 | 5.7 | 8.5 | 6.9 |
| Total of contents [parts by mass] | 10.2 | 11.2 | 30.2 | 11.0 | 13.8 | 12.2 |

Light Resistance Test

The dye (D1), the dye (D2) or dye (Dx), shown in Table 12, a polyimide resin C3G30 (trade name; produced by Mitsubishi Gas Chemical Company, Inc.), and cyclohexanone were thoroughly stirred and thereby uniformly dissolved. As for two kinds of dyes, the amount added of each dye was adjusted such that the light transmittance at the maximum absorption wavelength is 10% when the dye is added alone to the polyamide resin C3G30. The obtained solution was applied onto a glass plate (D263, manufactured by SCHOTT AG) and dried to obtain an absorption layer having a film thickness of 1.0 μm. Furthermore, an antireflection layer composed of a dielectric multilayer film was formed on the absorption layer of the absorption layer-attached glass plate by means of a vapor deposition machine to prepare a sample for light resistance test. In Table 12, Cases D-14 and D-15 (optical properties are shown in Table 10) are Examples of the invention, and Cases D-11 and D-12 (optical properties are shown in Table 11) are Comparative Examples.

A light resistance test of the obtained sample was performed using a weather meter tester (manufactured by Suga Test Instruments Co., Ltd.) with a xenon lamp as the light source. After the irradiation of 6,000 J/m² in terms of integrated light quantity at a wavelength of 300 nm to 400 nm, the residual rate of dye for light at a wavelength of 710 nm, 730 nm, 750 nm, and 770 nm was evaluated.

The residual rate was calculated as a percentage of the mass absorption constant after irradiation relative to the mass absorption constant before irradiation. The mass absorption constant was calculated by $-\log_{10}(T/100)$ after calculating the internal transmittance T [%] (=measured transmittance [%]/[100 [%]−measured reflectance [%]]) at the maximum absorption wavelength in a wavelength range of 350 nm to 1,200 nm. The sample was rated "A" in the case where the residual rate was 90% or more, and rated "C" in the case where the residual rate was less than 90%. As for the comprehensive judgment, in the case where a rating of "A" was given at all of four wavelengths, the sample was judged to be "A" as having light resistance, and in the case where a rating of "C" was given at any one wavelength, judged to be "C" as having no light resistance.

TABLE 12

| | Case D-14 | Case D-15 | Case D-11 | Case D-12 |
|---|---|---|---|---|
| Dye (D1) | I-12-15 | I-12-23 | I-12-23 | I-12-23 |
| Dye (D2) | II-3-2 | II-3-2 | — | — |
| Dye (Dx) | — | — | S2137 | S0773 |
| Residual rate at 710 nm | A | A | C | A |
| Residual rate at 730 nm | A | A | A | A |
| Residual rate at 750 nm | A | A | A | C |
| Residual rate at 770 nm | A | A | A | C |
| Comprehensive judgment | A | A | C | C |

Cases 1 to 6

Each of absorption layers shown in Table 14 was formed on one principal surface of a plate-shaped infrared absorbing glass, NF50GX (trade name, manufactured by Asahi Glass Co., Ltd., thickness: 0.12 mm). In Case 3, an absorption layer containing only the dye (D1) was formed in the same manner as in Case D-3 except for not containing the dye (D2) in the absorption layer of Example D-3. On the other principal surface of the obtained absorption layer-attached glass plate, six kinds of reflection layers 1 to 6 shown in Table 13 having a near-infrared reflecting area composed of a dielectric multilayer film were designed to make optical filters.

Cases 1 and 2 are Examples using the absorption layer of Cases D-3 and D-4, and Cases 4, 5 and 6 are Comparative Examples using the absorption layer of Cases D-8, D-10 and D-13, respectively.

In Table 13, optical properties of reflection layers 1 to 6 at an incident angle of 0° are shown $\lambda_{RE\text{-}SHT20}$ is the wavelength at which the transmittance is 20% on the shorter wavelength side of the absorption area.

TABLE 13

| | $\lambda_{RE\text{-}SHT20}$ [nm] |
|---|---|
| Reflection layer 1 | 739 |
| Reflection layer 2 | 749 |
| Reflection layer 3 | 759 |
| Reflection layer 4 | 769 |
| Reflection layer 5 | 779 |
| Reflection layer 6 | 789 |

With respect to the obtained optical filters, the following optical properties were evaluated. The results are shown in Table 14.

Difference between transmittance 20% wavelengths: $\lambda_{RE\text{-}SHT20} - \lambda_{AB\text{-}SHT20}$ Oblique incidence characteristic: An average of the transmittances of incident light with an incident angle of 0° and incident light with an incident angle of 35° in a wavelength range of 703 nm to 739 nm Average transmittance of T400-500: An average transmittance of light at a wavelength of 400 nm to 500 nm Maximum transmittance of T713-763: A maximum transmittance of light at a wavelength of 713 nm to 763 nm

TABLE 14

| | | Case 1 | Case 2 | Case 3 | Case 4 | Case 5 | Case 6 |
|---|---|---|---|---|---|---|---|
| Absorption layer | | Case D-3 | Case D-4 | — | Case D-8 | Case D-10 | Case D-13 |
| Dye (D1) | | I-12-23 | I-12-23 | I-12-23 | I-12-23 | I-12-23 | I-12-23 |
| Dye (D2) | | II-3-1 | III-2-1 | — | — | — | — |
| Dye (Dx) | | — | — | — | I-11-15 | FDR-005 | S2025 |
| $\lambda_{AB\text{-}SHT20}$ [nm] | | 686 | 688 | 696 | 683 | 684 | 689 |
| Difference | RL 1 | 53 | 51 | 43 | 56 | 55 | 50 |
| between | RL 2 | 63 | 61 | 53 | 66 | 65 | 60 |
| transmittance | RL 3 | 73 | 71 | 63 | 76 | 75 | 70 |
| 20% | RL 4 | 83 | 81 | 73 | 86 | 85 | 80 |
| wavelengths | RL 5 | 93 | 91 | 83 | 96 | 95 | 90 |
| [nm] | RL 6 | 103 | 101 | 93 | 106 | 105 | 100 |

TABLE 14-continued

|  |  | Case 1 | Case 2 | Case 3 | Case 4 | Case 5 | Case 6 |
|---|---|---|---|---|---|---|---|
| Oblique incidence characteristic [%/nm] | RL 1 | 3.1 | 3.3 | 9.0 | 1.2 | 1.6 | 4.2 |
|  | RL 2 | 3.1 | 4.5 | 15.0 | 3.0 | 2.9 | 6.0 |
|  | RL 3 | 2.4 | 3.9 | 15.0 | 4.0 | 3.7 | 5.5 |
|  | RL 4 | 3.1 | 4.9 | 25.0 | 10.6 | 9.9 | 8.2 |
|  | RL 5 | 4.4 | 4.9 | 34.0 | 21.1 | 19.7 | 9.7 |
|  | RL 6 | 7.7 | 4.6 | 38.0 | 31.5 | 29.1 | 9.4 |
| Average transmittance of T400-500 [%] | RL 1 | 82.4 | 77.8 | 84.7 | 80.7 | 72.4 | 81.1 |
|  | RL 2 | — | — | — | — | — | — |
|  | RL 3 | — | — | — | — | — | — |
|  | RL 4 | — | — | — | — | — | — |
|  | RL 5 | — | — | — | — | — | — |
|  | RL 6 | — | — | — | — | — | — |
| Maximum transmittance of T713-763 [%] | RL 1 | 3.8 | 4.2 | 13.0 | 3.9 | 3.6 | 5.1 |
|  | RL 2 | 4.3 | 7.2 | 27.0 | 7.0 | 6.6 | 9.9 |
|  | RL 3 | 4.7 | 8.9 | 45.0 | 20.6 | 19.6 | 14.6 |
|  | RL 4 | 6.2 | 11.4 | 56.0 | 39.9 | 37.0 | 17.1 |
|  | RL 5 | 8.7 | 13.1 | 71.0 | 51.9 | 47.9 | 22.4 |
|  | RL 6 | 11.0 | 12.9 | 85.0 | 65.6 | 60.7 | 24.6 |

*RL: reflection layer

As seen from Table 14, in Cases 1 and 2, which are Examples of the present filter, even when $\lambda_{RE\text{-}SHT20}$ of the reflection layer is changed in the range of $\lambda_{AB\text{-}SHT20}+30$ nm $\leq \lambda_{RE\text{-}SHT20} \leq 790$ nm, the incident angle dependence for light incident at a high incident angle can be sufficiently reduced. It is also understood that the transmittance of blue light at a wavelength of 400 nm to 500 nm is high and the near-infrared blocking property is good.

It is seen that in Case 3 where only the dye (D1) is used, when $\lambda_{RE\text{-}SHT20}$ of the reflection layer changes in the range of $\lambda_{AB\text{-}SHT20}+30$ nm $\leq \lambda_{RE\text{-}SHT20} \leq 790$ nm, a range outside the capability of sufficiently reducing the incident angle dependence for light incident at a high incident angle appears.

It is seen that in Cases 4 and 5 where the dye (D1) and a dye (Dx) out of the scope of the dye (D2) of the present invention are used, when $\lambda_{RE\text{-}SHT20}$ of the reflection layer changes in the range of $\lambda_{AB\text{-}SHT20}+30$ nm $\leq \lambda_{RE\text{-}SHT20} \leq 790$ nm, a range outside the capability of sufficiently reducing the incident angle dependence for light incident at a high incident angle appears. Furthermore, in Example 5 where the dye (Dx) is a phthalocyanine compound, the transmittance of blue light at a wavelength of 400 nm to 500 nm is low.

It is seen that in Case 6, although the dye (D1) and a dye (Dx) out of the scope of the dye (D2) of the present invention are used, even when $\lambda_{RE\text{-}SHT20}$ of the reflection layer changes in the range of $\lambda_{AB\text{-}SHT20}+30$ nm $\leq \lambda_{RE\text{-}SHT20} \leq 790$ nm, the incident angle dependence for light incident at a high incident angle can be reduced. However, in Case 6, the dye (Dx) is a cyanine compound, and it can be suggested that the light resistance is insufficient.

INDUSTRIAL APPLICABILITY

The optical filter of the present invention ensures good transmittance of visible light, among others, blue light, has good near-infrared blocking characteristics capable of preventing deterioration in the blocking property for near-infrared light particularly at a high incident angle, enables to reduce the incident angle dependence over a wide wavelength range and in turn, increase the degree of freedom in the reflection layer design, exhibits excellent light resistance. Therefore, the optical filter of the present invention is useful for applications, for example, an imaging device such as digital still camera which has recently been enhanced to have higher performance.

REFERENCE SIGNS LIST 10A, 10B: Optical filter, 11: absorption layer, 12: reflection layer, 13: transparent substrate, 14: antireflection layer

The invention claimed is:

1. An optical filter, comprising:

an absorption layer comprising a first near-infrared absorbing dye (D1), a second near-infrared absorbing dye (D2), and a transparent resin; and a reflection layer comprising a dielectric multilayer film, wherein the first near-infrared absorbing dye (D1) and the second near-infrared absorbing dye (D2) have the following properties (1) to (3):

(1) the first near-infrared-absorbing dye (D1) is a compound represented by any one of the following formulae (I) to (III), wherein in a spectral transmittance curve over a wavelength range of 400 nm to 1,100 nm as measured in a state of the dye being contained in the transparent resin, a maximum absorption wavelength $\lambda_{max(D1)}$ is within a wavelength range of 680 nm to 730 nm, and a difference between a wavelength at which a transmittance is 80% on the shorter wavelength side than the maximum absorption wavelength $\lambda_{max(D1)}$ when the concentration is adjusted such that a transmittance at the maximum absorption wavelength $\lambda_{max(D1)}$ is 10%, and the maximum absorption wavelength $\lambda_{max(D1)}$ is 100 nm or less;

(2) the second near-infrared-absorbing dye (D2) is a compound represented by any one of the following formulae (II-3), (III-1) and (III-2), wherein in a spectral transmittance curve over a wavelength range of 400 nm to 1,100 nm as measured in a state of the dye being contained in the transparent resin, a maximum absorption wavelength $\lambda_{max(D2)}$ is within a wavelength range of 720 nm to 770 nm; and (3) a value obtained by subtracting the maximum absorption wavelength $\lambda_{max(D1)}$ from the maximum absorption wavelength $\lambda_{max(D2)}$ is 30 nm or more and 85 nm or less,

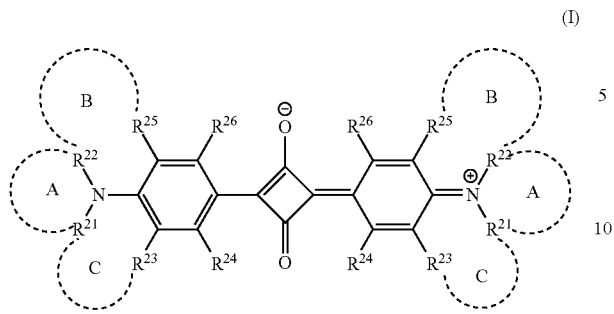

(I)

wherein symbols in the formula (I) are as follows:

each of $R^{24}$ and $R^{26}$ independently represents a hydrogen atom, a halogen atom, a hydroxyl group, an alkyl or alkoxy group comprising 1 to 6 carbon atoms, an acyloxy group comprising 1 to 10 carbon atoms, —$NR^{27}R^{28}$ (wherein each of $R^{27}$ and $R^{28}$ independently represents a hydrogen atom, an alkyl group comprising 1 to 20 carbon atoms, —C(=O)—$R^{29}$ (wherein $R^{29}$ is a hydrogen atom or a hydrocarbon group comprising 1 to 25 carbon atoms which may comprise a substituent and may comprise, between carbon atoms, an unsaturated bond, an oxygen atom or a saturated or unsaturated ring structure), —$NHR^{30}$, or —$SO_2$—$R^{30}$ (wherein each $R^{30}$ represents a hydrocarbon group comprising 1 to 25 carbon atoms in which one or more hydrogen atoms may be replaced by a halogen atom, a hydroxyl group, a carboxy, group, a sun group or a cyano group and which may comprise, between carbon atoms, an unsaturated bond, an oxygen atom or a saturated or unsaturated ring structure)), or a group represented by the following formula (S) (wherein $R^{41}$ and $R^{42}$ independently represent a hydrogen atom, a halogen atom, or an alkyl or alkoxy group comprising 1 to 10 carbon atoms, and k is 2 or 3),

(S)

wherein:

$R^{21}$ and $R^{22}$, $R^{22}$ and $R^{25}$, and $R^{21}$ and $R^{23}$ may combine with each other to form, respectively, heterocyclic ring A, heterocyclic ring B, and heterocyclic ring C, which are 5- or 6-membered rings together with the nitrogen atom;

$R^{21}$ and $R^{22}$, when forming heterocyclic ring A, represent, as a divalent group -Q- where these are bonded, an alkylene or alkyleneoxy group, in which a hydrogen atom may be replaced by an alkyl group comprising 1 to 6 carbon atoms, an aryl group comprising 6 to 10 carbon atoms, or an acyloxy group comprising 1 to 10 carbon atoms which may comprise a substituent; and $R^{22}$ and $R^{25}$, when forming heterocyclic ring B, and $R^{21}$ and $R^{23}$, when forming heterocyclic ring C, respectively represent divalent groups and —$X^1$—$Y^1$— and —$X^2$—$Y^2$— (wherein a side bonded to nitrogen is $X^1$ and $X^2$) where they are bonded, wherein each of $X^1$ and $X^2$ is a group represented by the following formula (1x) or (2x) and each of $Y^1$ and $Y^2$ is a group represented by any one selected from the following formulae (1y) to (5y); in a case where each of $X^1$ and $X^2$ is a group represented by the formula (2x), each of $Y^1$ and $Y^2$ may be a single bond, and in this case, an oxygen atom may be present between carbon atoms,

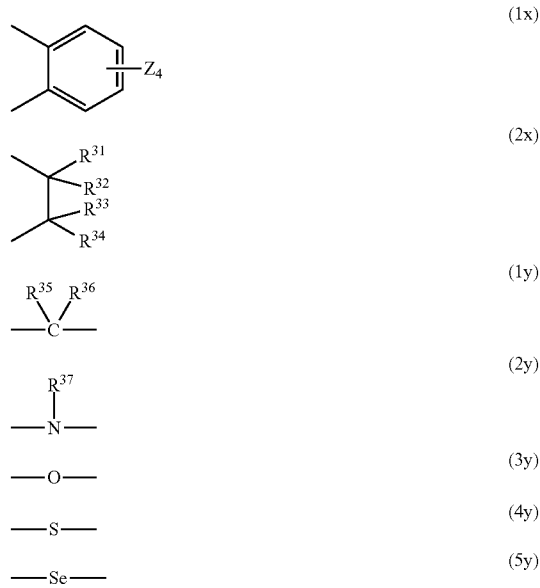

wherein:

in the formula (1x), each of four Zs independently represents a hydrogen atom, a hydroxyl group, an alkyl or alkoxy group comprising 1 to 6 carbon atoms, or —$NR^{38}R^{39}$ (wherein each of $R^{38}$ and $R^{39}$ independently represents a hydrogen atom or an alkyl group comprising 1 to 20 carbon atoms); each of $R^{31}$ to $R^{36}$ independently represents a hydrogen atom, an alkyl group comprising 1 to 6 carbon atoms or an aryl group comprising 6 to 10 carbon atoms, and $R^{37}$ represents an alkyl group comprising 1 to 6 carbon atoms or an aryl group comprising 6 to 10 carbon atoms;

$R^{27}$, $R^{28}$, $R^{29}$, $R^{31}$ to $R^{37}$, $R^{21}$ to $R^{23}$ when not forming a heterocyclic ring, and $R^{25}$ may combine with any other member among these to form a 5- or 6-membered ring; $R^{31}$ and $R^{36}$, or $R^{31}$ and $R^{37}$ may be bonded directly; and each of $R^{21}$ and $R^{22}$ when not forming a heterocyclic ring independently represents a hydrogen atom, an alkyl group or allyl group comprising 1 to 6 carbon atoms which may comprise a substituent, or an aryl or alaryl group comprising 6 to 11 carbon atoms which may comprise a substituent; each of $R^{23}$ and $R^{25}$ when not forming a heterocyclic ring independently represents a hydrogen atom, a halogen atom, or an alkyl or alkoxy group comprising 1 to 6 carbon atoms, (II)

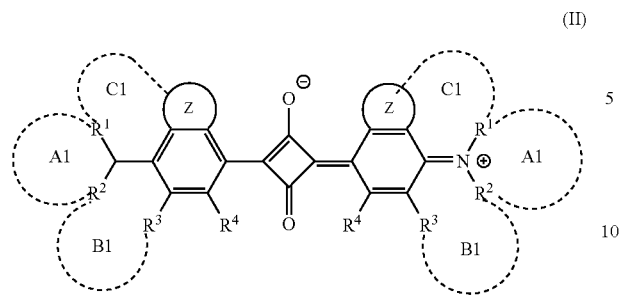

wherein symbols in the formula (II) are as follows:
each of rings Z is independently a 5- or 6-membered ring comprising from 0 to 3 heteroatoms in the ring, and a hydrogen atom contained in ring Z may be replaced; and $R^1$ and $R^2$, $R^2$ and $R^3$, and $R^1$ and a carbon atom or heteroatom constituting ring Z may combine with each other to form, respectively, heterocyclic ring A1, heterocyclic ring B1, and heterocyclic ring C1, together with a nitrogen atom, and in this case, a hydrogen atom contained in heterocyclic ring A1, heterocyclic ring B1 and heterocyclic ring C1 may be replaced; each of $R^1$ and $R^2$ when not forming a heterocyclic ring independently represents a hydrogen atom, a halogen atom, or a hydrocarbon group which may comprise, between carbon atoms, an unsaturated bond, a heteroatom, or a saturated or unsaturated ring structure and may comprise a substituent; each of $R^4$ and $R^3$ when not forming a heterocyclic ring independently represents a hydrogen atom, a halogen atom, or an alkyl or alkoxy group which may comprise a heteroatom between carbon atoms and may comprise a substituent, (III)

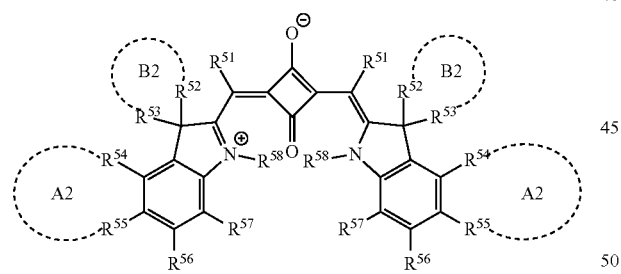

wherein symbols in the formula (III) are as follows:
each $R^{51}$ independently represents a halogen atom or an alkyl group comprising 1 to 3 carbon atoms which may comprise a substituent;
each of $R^{52}$ to $R^{58}$ independently represents a hydrogen atom, a halogen atom, or an alkyl group comprising 1 to 10 carbon atoms which may comprise a substituent;
$R^{52}$ and $R^{53}$ may combine with each other to form saturated or unsaturated hydrocarbon ring B2 comprising 5 to 15 carbon atoms, and a hydrogen atom of hydrocarbon ring B2 may be replaced by a halogen atom or an alkyl group comprising 1 to 10 carbon atoms which may comprise a substituent; and
$R^{54}$ and $R^{55}$ may combine with each other to form benzene ring A2, and a hydrogen atom of benzene ring A2 may be replaced by a halogen atom or an alkyl group comprising 1 to 10 carbon atoms which may comprise a substituent, (II-3)

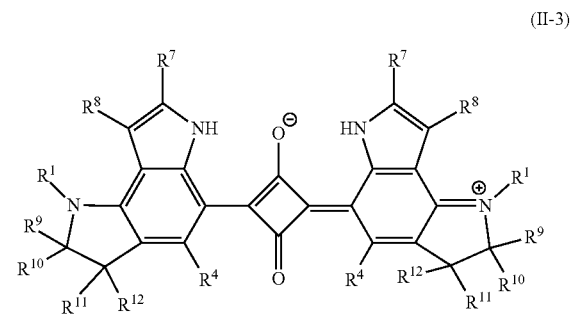

wherein in the formula (II-3), each of $R^1$, $R^4$ and $R^9$ to $R^{12}$ independently represents a hydrogen atom, a halogen atom, or an alkyl group comprising 1 to 15 carbon atoms which may comprise a substituent, and each of $R^7$ and $R^8$ independently represents a hydrogen atom, a halogen atom, or an alkyl group comprising 1 to 5 carbon atoms which may comprise a substituent, and (III-1)

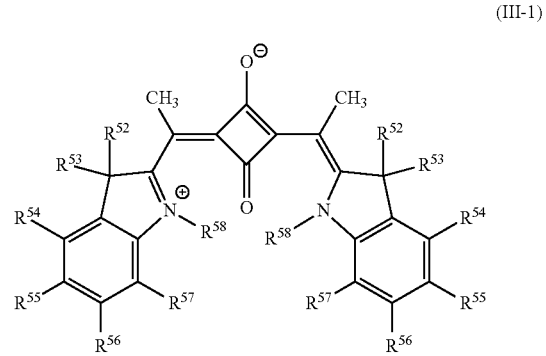

(III-2)

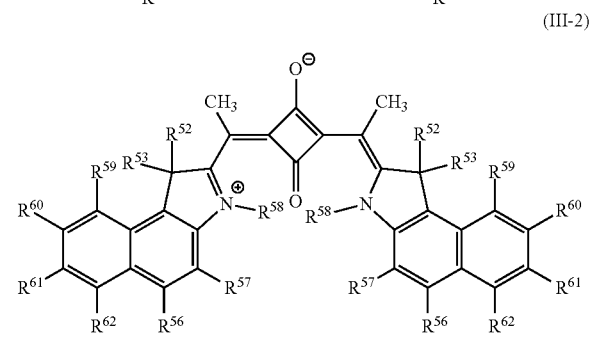

wherein in the formulae (III-1) and (III-2) each of $R^{52}$ to $R^{62}$ independently represents a hydrogen atom, a halogen atom, or an alkyl group comprising 1 to 10 carbon atoms which may comprise a substituent.

2. The optical filter according to claim 1, wherein in a spectral transmittance curve over a wavelength range of 400 nm to 1,100 nm as measured in a state of the first near-infrared-absorbing dye (D1) and the second near-infrared-absorbing dye (D2) being contained in the transparent resin at such a concentration that, when each dye is contained alone in the transparent resin, transmittances at the maximum absorption wavelength $\lambda_{max(D1)}$ and the maximum absorption wavelength $\lambda_{max(D2)}$ are respectively 10%, (i-1) to (i-3) are satisfied:
- (i-1) the spectral transmittance curve shows two wavelengths at which the transmittance is 20% for light in a wavelength range of 650 nm to 800 nm, wherein the difference between the two wavelengths is 70 nm or more;
- (i-2) a maximum transmittance for light in a wavelength range from the maximum absorption wavelength $\lambda_{max(D1)}$ to the maximum absorption wavelength $\lambda_{max(D1)}+50$ nm is 20% or less; and
- (i-3) an average transmittance for light in a wavelength range from the maximum absorption wavelength $\lambda_{max(D1)}-20$ nm to the maximum absorption wavelength $\lambda_{max(D1)}+80$ nm is 30% or less.

3. The optical filter according to claim 2, wherein in the spectral transmittance curve over a wavelength range of 400 nm to 1,100 nm as measured in a state of the first near-infrared-absorbing dye (D1) and the second near-infrared-absorbing dye (D2) being contained in the transparent resin at such a concentration that, when each dye is contained alone in the transparent resin, transmittances at the maximum absorption wavelength $\lambda_{max(D1)}$ and the maximum absorption wavelength $\lambda_{max(D2)}$ are respectively 10%, an average transmittance of light in a wavelength range of 400 nm to 500 nm is 85% or more.

4. The optical filter according to claim 1, wherein:
- the absorption layer has a shorter wavelength-side wavelength $\lambda_{AB-SHT20}$ at which a transmittance for light with an incident angle of 0° is 20%, the shorter wavelength-side wavelength $\lambda_{AB-SHT20}$ being within a wavelength range of 650 nm to 720 nm; and
- the reflection layer has a near-infrared light reflection wavelength range, and has a shorter wavelength-side wavelength $\lambda_{RE-SHT20}$ at which a transmittance for light with an incident angle of 0° is 20%, the shorter wavelength-side wavelength $\lambda_{RE-SHT20}$ satisfying (ii-1):
- (ii-1) $\lambda_{AB-SHT20}+30$ nm $\leq \lambda_{RE-SHT20} \leq 790$ nm.

5. The optical filter according to claim 4, wherein the reflection layer further satisfies (ii-2):
- (ii-2) an average transmittance for light in a wavelength range from $\lambda_{AB-SHT20}$ to $\lambda_{RE-SHT20}+300$ nm is 10% or less.

6. The optical filter according to claim 1, wherein when each of the first near-infrared-absorbing dye (D1) and the second near-infrared-absorbing dye (D2) are contained alone in the transparent resin, each of the first near-infrared-absorbing dye (D1) and the second near-infrared-absorbing dye (D2) has a mass absorption constant of 1,000/(cm·mass %) or more.

7. The optical filter according to claim 1, wherein the transparent resin comprises at least one selected from the group consisting of a polyester resin, an acrylic resin, an epoxy resin, an ene-thiol resin, a polycarbonate resin, a polyether resin, a polyarylate resin, a polysulfone resin, a polyethersulfone resin, a polyparaphenylene resin, a polyarylene ether phosphine oxide resin, a polyamide resin, a polyimide resin, a polyamideimide resin, a polyolefin resin, a cyclic olefin resin, a polyurethane resin, and a polystyrene resin.

8. The optical filter according to claim 1, wherein a total content of the first near-infrared-absorbing dye (D1) and the second near-infrared-absorbing dye (D2) in the absorption layer is from 0.01 to 20 parts by mass per 100 parts by mass of the transparent resin.

9. The optical filter according to claim 1, wherein:
- the optical filter further comprises a transparent substrate; and
- each of the absorption layer and the reflection layer is provided on a principal surface of the transparent substrate.

10. The optical filter according to claim 9, wherein the transparent substrate is made of a glass or a sapphire.

11. The optical filter according to claim 10, wherein the glass is a fluorophosphate-based glass comprising a copper ion added or a phosphate-based glass comprising a copper ion added.

12. An imaging device, comprising:
- a solid-state image sensing device;
- an imaging lens; and
- the optical filter according to claim 1.

13. The optical filter according to claim 1, wherein the second near-infrared-absorbing dye (D2) is represented by the formula (II-3).

* * * * *